(12) United States Patent
Tanaka et al.

(10) Patent No.: US 9,067,491 B2
(45) Date of Patent: Jun. 30, 2015

(54) DRIVE APPARATUS FOR AN ELECTRIC AUTOMOBILE

(71) Applicant: NSK Ltd., Tokyo (JP)

(72) Inventors: Kazutaka Tanaka, Kanagawa (JP); Eiji Inoue, Kanagawa (JP); Takashi Imanishi, Kanagawa (JP); Yasuyuki Matsuda, Kanagawa (JP); Daisuke Gunji, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/354,765

(22) PCT Filed: Oct. 24, 2012

(86) PCT No.: PCT/JP2012/077516
§ 371 (c)(1),
(2) Date: Apr. 28, 2014

(87) PCT Pub. No.: WO2013/062017
PCT Pub. Date: May 2, 2013

(65) Prior Publication Data
US 2014/0287863 A1      Sep. 25, 2014

(30) Foreign Application Priority Data

Oct. 28, 2011 (JP) ................................ 2011-236658
Oct. 10, 2012 (JP) ................................ 2012-224983

(51) Int. Cl.
*F16H 3/46* (2006.01)
*B60K 1/00* (2006.01)
(Continued)

(52) U.S. Cl.
CPC . *B60K 17/12* (2013.01); *B60K 1/00* (2013.01); *F16H 3/663* (2013.01); *H02K 7/116* (2013.01);
(Continued)

(58) Field of Classification Search
CPC ............... F16H 3/46; F16H 3/48; F16H 3/52; F16H 3/56; F16H 2200/0021; F16H 2200/2007; F16H 2200/2023; F16H 2200/2035; H02K 7/116; B60K 1/00; B60K 2001/001
See application file for complete search history.

(56) References Cited

U.S. PATENT DOCUMENTS

2014/0243136 A1*  8/2014  Hikida et al. .................... 475/5

FOREIGN PATENT DOCUMENTS

JP     48-4867    1/1973
JP     60-8548    1/1985
(Continued)

OTHER PUBLICATIONS

International Search Report dated Dec. 25, 2012 for International Application No. PCT/JP2012/077516.

*Primary Examiner* — Jacob S Scott
(74) *Attorney, Agent, or Firm* — Katten Muchin Rosenman LLP

(57) ABSTRACT

Construction capable of improving the convenience of an electric automobile is achieved by making the drive apparatus for an electric automobile in which a planetary-gear transmission 11 is assembled more compact and simple, and increasing the distance traveled per charge. The planetary-gear transmission 11 comprises a single-pinion first planetary-gear mechanism 12 and a double-pinion second planetary-gear mechanism 13, and reduces power from an electric motor 1a by a desired reduction ratio before transmitting that power to a driven-side rotating shaft 5a. A first braking device 14 switches a ring gear 22 and a second braking device 15 switches a second sun gear 19 between a state of being allowed to rotate and a state of being prevented from rotating with respect to a fixed portion.

5 Claims, 18 Drawing Sheets

(51) Int. Cl.
  *B60K 17/12* (2006.01)
  *F16H 3/66* (2006.01)
  *H02K 7/116* (2006.01)
  *F16H 3/44* (2006.01)

(52) U.S. Cl.
  CPC . *F16H 2200/0021* (2013.01); *F16H 2200/0034* (2013.01); *F16H 2200/2005* (2013.01); *F16H 2200/2023* (2013.01); *B60K 2001/001* (2013.01); *Y02T 10/641* (2013.01); *F16H 2200/2035* (2013.01); *F16H 3/46* (2013.01); *F16H 2003/442* (2013.01)

(56) References Cited

FOREIGN PATENT DOCUMENTS

| | | |
|---|---|---|
| JP | 2006-22879 | 1/2006 |
| JP | 2009-250375 | 10/2009 |
| JP | 2010-90947 | 4/2010 |
| JP | 2010-223298 | 10/2010 |
| JP | 2011-37359 | 2/2011 |
| JP | 2011-208681 | 10/2011 |

\* cited by examiner

DRIVE APPARATUS FOR AN ELECTRIC AUTOMOBILE

TECHNICAL FIELD

The present invention relates to a drive apparatus for an electric automobile that reduces the output power from an electric motor and transmits that power to drive wheels.

BACKGROUND ART

In recent years, influenced by a trend to reduce the reliance on fossil fuels, research of electric automobiles is advancing, and electric automobiles have in part already been put into practical use. The electric motor, which is the power source of an electric automobile, differs from an internal combustion engine that runs by direct combustion of fossil fuels in that the torque and rotational speed characteristics of an output shaft, such as typically generating maximum torque at start up, are preferable for an automobile, so it is not absolutely necessary to have a transmission that is required by a typical automobile having an internal combustion engine as the driving source. However, even in the case of an electric automobile, by providing a transmission, it is possible to improve the accelerating performance and high-speed performance. More specifically, by providing a transmission, the relationship between the traveling speed and acceleration of an automobile is close to that of a gasoline engine automobile in which a transmission is provided in the power train, and smooth driving is possible. This will be explained with reference to FIG. 19.

For example, when a power transmission apparatus having a large reduction ratio is provided between the output shaft of an electric motor, which is the driving source of an electric automobile, and the input section of a differential gear, which is connected to the drive wheels, the relationship between the acceleration (G) and the traveling speed (km/h) of an electric automobile is as illustrated by left half of the solid line "a" being continuous with the chain line "b" in FIG. 19. In other words, the acceleration performance at low speed is excellent, however, high-speed travel becomes impossible. On the other hand, when a power transmission apparatus having a small reduction ratio is provided between the output shaft and the input section, the relationship between the acceleration and the traveling speed is as illustrated by the chain line "c" being continuous with the right half of the solid line "a" in FIG. 19. In other words, high-speed travel becomes possible, however the acceleration performance at low speed is impaired. However, by providing a transmission between the output shaft and the input section and changing the reduction ratio of that transmission according to the vehicle speed, it is possible to obtain a characteristic such as the left half and the right half of the solid line "a" being continuous. This characteristic is nearly equivalent to a typical gasoline engine automobile having the same amount of output power as illustrated by the dashed line "d" in FIG. 19, and in regards to the acceleration performance and high-speed performance, by providing a transmission, it is known that even in an electric automobile it is possible to obtain performance equivalent to that of a gasoline engine automobile.

FIG. 20 illustrates an example of conventional construction of a drive apparatus for an electric automobile in which a transmission is provided between the output shaft of the electric motor and the input section of a differential gear that is connected to the drive wheels, as disclosed in JP 2006-022879 (A). This drive apparatus for an electric automobile is constructed so as to rotate and drive a pair of left and right drive wheels by transmitting the rotation of the output shaft of an electric motor 1 to a rotation transmission apparatus 3 by way of a transmission 2. In the transmission 2, there is a pair of gear transmission mechanisms 6a, 6b that are located between a drive-side rotating shaft 4 that is concentric with the output shaft of the electric motor 1 and a driven-side rotating shaft 5, and these gear transmission mechanisms 6a, 6b have different reduction ratios. By switching a pair of clutch mechanisms 7a, 7b, only one of the gear transmission mechanisms 6a, 6b is placed in a state capable of transmitting power, making it possible to switch the reduction ratio between the drive-side rotating shaft 4 and the driven-side rotating shaft 5 between two steps: large and small.

More specifically, one clutch mechanisms 7a of these clutch mechanisms 7a, 7b can be controlled by an actuator, while the other clutch mechanism 7b is an overrunning clutch that becomes disengaged when the rotational speed becomes a fixed value or greater. When the one clutch mechanism 7a is engaged, the other clutch mechanism 7b becomes disengaged, and the rotation torque of the drive-side rotating shaft 4 is transmitted to the driven-side rotating shaft 5 by way of the gear transmission mechanism 6a of the gear transmission mechanisms 6a, 6b that has a small reduction ratio. When the one clutch mechanism 7a is disengaged, the other clutch mechanism 7b becomes engaged, and the rotation torque of the drive-side rotating shaft 4 is transmitted to the driven-side rotating shaft 5 by way of the other gear transmission mechanism 6b having a large reduction ratio. The rotation of the driven-side rotating shaft 5 is transmitted to the input section of the differential gear 8 by a rotation transmission apparatus 3, and as a result, the output shafts 9a, 9b that support the pair of left and right drive wheels are rotated and driven.

In the case of this kind of conventional construction, a pair of gear transmission mechanisms 6a, 6b are provided between the drive-side rotating shaft 4 and driven-side rotating shaft 5 so as to be separated in the radial direction and parallel with each other. Moreover, the gear transmission mechanism 6a (6b) transmits power by engagement of a gear 10a (10b) that is provided in the middle section in the axial direction of the drive-side rotating shaft 4 and a gear 10c (10d) that is provided in the middle section in the axial direction of the driven-side rotating shaft 5. Therefore, the gears 10a, 10c (10b, 10d), which engage with each other, must have sufficient strength and durability so as to be able to transmit all of the power that is outputted from the electric motor 1. Therefore, there is a problem in that the drive apparatus for an electric automobile in which gear transmission mechanisms 6a, 6b are assembled becomes large and the weight increases.

The one clutch mechanism 7a requires an actuator for switching the engaged and disengaged (engagement) state. In other words, the one clutch mechanism 7a is provided in the middle section in the axial direction of the drive-side rotating shaft 4, and with the drive-side rotating shaft 4 in a rotating state, must switch between the engaged and disengaged state of the gear of one gear transmission mechanism 6a of the pair of the gear transmission mechanism 6a, 6b (between state in which the drive-side rotating shaft 4 and gear 10a rotate in synchronization, and state in which the gear 10a idles with respect to the drive-side rotating shaft 4). Therefore, an electromagnetic clutch is used as the one clutch mechanism 7a, so there is a possibility that the construction of the drive apparatus for an electric automobile will become complex. Moreover, in this case, it also becomes difficult to maintain the torque transmission capacity.

In order to lengthen the traveling distance per one charge in order to improve the convenience of an electric automobile, making the drive apparatus for an electric automobile more compact and lightweight, and reducing the amount of power consumed per traveling distance is essential. As technology for making the drive apparatus for an electric automobile more compact, JP 2010-090947 (A) and JP 2010-223298 (A) disclose technology in which rotating shafts that are connected to a transmission and that have different reduction ratios from each other are provided on both the inner-diameter side and outer-diameter side of the tube shaped output shaft of an electric motor so as to be concentric with the output shaft, where one rotating shaft of the inner-diameter-side rotating shaft and outer-diameter-side rotating shaft is rotated and driven by a pair of clutches. However, in the construction disclosed in these patent literatures as well, transmission of power between a pair of rotating shafts is performed by engagement of a pair of gears. The clutch must have an actuator that, with a rotating shaft rotating, switches the gear that is provided in the middle section in the axial direction of the rotating shaft between a state of rotating in synchronization with the rotating shaft, and a state of idling with respect to the rotating shaft, and from the aspect of simplifying the construction of a drive apparatus for an electric automobile, there is room for improvement.

RELATED LITERATURE

Patent Literature

[Patent Literature 1] JP 2006-022879 (A)
[Patent Literature 2] JP 2010-090947 (A)
[Patent Literature 3] JP 2010-223298 (A)

SUMMARY OF THE INVENTION

Problem to be Solved by the Invention

In consideration of the problems above, the object of the present invention is to achieve a drive apparatus for an electric automobile having compact and simple construction, and that is capable of improving the convenience of an electric automobile by lengthening the distance traveled per charge.

Means for Solving the Problems

In order to make the drive apparatus of an electric automobile more compact, the inventors investigated construction that uses a planetary-gear transmission as a transmission that is assembled in the drive apparatus for an electric automobile. However, design of a planetary-gear mechanism for obtaining performance equivalent to that of a gasoline engine automobile in which a typical transmission is installed is difficult by simply using a planetary-gear mechanism as the transmission. Moreover, a clutch mechanism is necessary for switching between a state of directly transmitting power between a drive-side rotating shaft and driven-side rotating shaft with these rotating shafts in a state of rotation, so there is a problem in that construction of the apparatus becomes complex, or the planetary-gear mechanism itself becomes large. Therefore, the inventors further investigated construction that uses a planetary-gear mechanism, and were able gain knowledge for solving the problem above by devising construction of a planetary-gear mechanism that led to the completion of the present invention.

In other words, the drive apparatus for an electric automobile of the present invention, includes: an electric motor having an output shaft; a planetary-gear transmission having a drive-side rotating shaft that is rotated and driven by the output shaft of the electric motor and a driven-side rotating shaft; and a rotation transmission apparatus for transmitting the rotation of the driven-side rotating shaft of the planetary-gear transmission to a pair of left and right drive wheels.

Particularly, in the apparatus of the present invention, the planetary-gear transmission has the drive-side rotating shaft, and the driven-side rotating shaft, as well as a first planetary-gear mechanism, a second planetary-gear mechanism, a ring gear, a first braking device and a second braking device.

More specifically, the first planetary-gear mechanism is a single-pinion planetary-gear mechanism that has a first sun gear that is provided so as to be rotated and driven by the drive-side rotating shaft, a plurality (for example, 3 or 4) of first planet gears that engage with the first sun gear, and a carrier that supports the first planet gears so as to be able to rotate and rotates and drives the driven-side rotating shaft.

The second planetary-gear mechanism is a double-pinion planetary-gear mechanism that has a second sun gear, a plurality of second planet gears that are provided on the outer-diameter side and concentric with the first planet gears, and that rotate in synchronization with the first planet gears, the same number of third planet gears as the second planet gears, that are provided on the inner-diameter side and engage with the second sun gear, and a carrier that is common with that of the first planetary-gear mechanism, in which the carrier supports the second planet gears and third planet gears so as to be able to rotate freely, and in a state in which the second planet gears and third planet gears engage with each other to form a pair.

The ring gear engages with the first planet gears or the second planet gears.

The first braking device switches the ring gear and the second braking device switches the second sun gear respectively between a state in which rotation with respect to a fixed portion, such as a casing that houses the planetary-gear transmission, is prevented, and a state in which rotation with respect to the fixed portion is allowed. In a low-speed mode state having a large reduction ratio, the first braking device prevents the rotation of the ring gear with respect to the fixed portion, and the second braking device is released, allowing the second sun gear to rotate with respect to the fixed portion. On the other hand, in a high-speed mode state, the first braking device is released, allowing the ring gear to rotate with respect to the fixed portion, and the second braking device prevents the second sun gear from rotating with respect to the fixed portion.

In the case of embodying the present invention, preferably, in order to switch the operating states of the first braking device and second braking device, an electric actuator having a piston, a servo motor and a worm wheel is used. The piston has a male screw section around the outer circumferential surface of part in the axial direction thereof, and is located inside a casing that houses the planetary-gear transmission so as to be able to displace in the axial direction with rotation prevented. The servo motor has an output shaft and a worm gear that is supported by and fastened to the output shaft. The worm wheel is formed into a ring shape and engages with the worm gear, and has a female screw section formed around the inner circumferential surface thereof that engages with the male screw section. By rotating the output shaft of the servo motor and rotating and driving the worm wheel, engagement between the male screw section and the female screw section causes the piston to displace in the axial direction. This displacement in the axial direction causes the fixed portion and a friction engaging section of the opposing member, which is the ring gear or second sun gear, or portions that rotate in synchronization with the ring gear or second sun gear, to displace in a direction toward each other, which presses the friction engaging section against the fixed portion, and the friction engagement between these portions prevents rotation of the ring gear or second sun gear with respect to the fixed portion. In this specification, the meaning of "fixed portion" also includes a member that is assembled to this fixed portion with rotation prevented.

In this case, preferably a single actuator is used as the actuator for switching the operating states of the first braking device and second braking device. In other words, the first braking device and second braking device are located on opposite sides in the axial direction of the piston, a first friction engaging section that is formed on the ring gear or a portion that rotates in synchronization with the ring gear faces one end surface in the axial direction of the piston, and a second friction engaging section that is formed on the second sun gear or on a portion that rotates in synchronization with the second sun gear faces the other end surface in the axial direction of the piston. When the servo motor rotates in a specified direction, the piston displaces in a direction that causes the one end section in the axial direction of the piston to press the first friction engaging section toward the fixed portion. On the other hand, when the servo motor is rotated in a direction opposite the specified direction, the piston displaces in a direction that causes the other end section in the axial direction of the piston to press the second friction engaging section toward the fixed portion.

Alternatively, the piston has a first piston having a first male screw section and a second piston having a second male screw section, the first and second male screw sections respectively formed around the outer circumferential surface of the base end section in the axial direction thereof and cut in opposite directions to each other. The inner circumferential surface of the worm wheel is a stepped cylindrical surface having a large-diameter section on half in the axial direction and a small-diameter section on the other half in the axial direction that are continuous by way of a stepped section, a first female screw section that engages with the first male screw section is provided on the large-diameter section, and a second female screw section that engages with the second male screw section is provided on the small-diameter screw section. The first braking device and second braking device are placed on the same side in the axial direction with respect to the piston, the tip end surface of the first piston faces a first friction engaging section that is formed on the ring gear or a portion that rotates in synchronization with the ring gear, and the tip end surface of the second piston faces a second friction engaging section that is formed on the second sun gear or a portion that rotates in synchronization with the second sun gear. When the servo motor is rotated in a specified direction, the first piston displaces in a direction that causes the tip end section in the axial direction of the first piston to press the first friction engaging section toward the fixed portion, and the second piston displaces in a direction that releases the force by which the tip end section of the second piston presses the second friction engaging section toward the fixed portion. On the other hand, when the servo motor rotates in a direction opposite the specified direction, the first piston displays in a direction that releases the force by which the tip end section in the axial direction of the first piston presses the first friction engaging section toward the fixed portion, and the second piston displaces in a direction that causes the tip end section of the second piston to press the second friction engaging section toward the fixed portion.

The step ratio, which is a value obtained by dividing the reduction ratio of the planetary-gear transmission in the low-speed mode state by the reduction ratio in the high-speed mode thereof, is 2 or close to 2, more specifically is within the range of 1.8 to 2.2, preferably is 2. The reduction ratio is a value obtained by dividing the absolute value of the rotating torque of the driven-side rotating shaft by the output torque of the electric motor in each state, which is calculated assuming that there is no friction loss, and that the transmission efficiency is 100%.

When the actuator for switching the operating states of the first braking device and second braking device of the drive apparatus for an electric automobile of the present invention is an electric type having a servo motor as the driving source, instead of construction in which the piston is caused to displace in the axial direction by the engagement between male screw sections on the piston such as described above and the female screw section of the worm wheel, it is possible to employ ball-screw mechanism in which a plurality of balls are provided between an outer-diameter side helical ball-screw groove having a partial arc shape in cross section that is formed around the inner circumferential surface of the worm wheel, and an inner-diameter side helical ball-screw groove having a partial arc shape in cross section that is formed around the outer circumferential surface of the piston so as to be able to roll freely. In other words, the electric type actuator converts the rotational driving force of the servo motor to thrust force in the axial direction, and this thrust force in the axial direction causes relative displacement of friction engaging section of an opposing member to move toward a fixed portion, and presses the opposing member against the fixed portion to create friction engagement between the fixed portion and the opposing member, preventing rotation of the opposing member with respect to the fixed portion.

That is, the drive apparatus for an electric automobile of the present invention has a planetary-gear transmission that has a drive-side rotating shaft that is rotated and driven by an output shaft of an electric motor, and a driven-side rotating shaft that transmits rotation to a rotation transmission apparatus for transmitting rotation to a pair of left and right drive wheels; wherein this planetary-gear transmission has a single-pinion first planetary-gear mechanism that is connected to the drive-side rotating shaft, and a double-pinion second planetary-gear mechanism in which one of two planet gears forms a long pinion gear with a planet gear of the first planetary-gear mechanism, and is constructed such that the transmission of power from the second planetary-gear mechanism to the driven-side rotating shaft is by way of the revolution of one of the two planet gears of the second planetary-gear mechanism, and where by switching between the planet gears that revolve for transmitting this power, it is possible to switch between a low-speed mode having a large reduction ratio and a high-speed mode having a small reduction ratio.

With this kind of construction, the operating mode is switched between a mode in which the rotation of the sun gear of the first planetary-gear mechanism is transmitted to the driven-side rotating shaft by way of rotation of the planet gears of the first planetary-gear mechanism, rotation of the one planet gear of the second planetary-gear mechanism and revolution of this one planet gear, and the carrier that is connected to this one planet gear, and a mode in which the rotation of the sun gear of the first planetary-gear mechanism is transmitted to the driven-side rotating shaft by way of rotation of the planet gears of the first planetary-gear mechanism, rotation of the one planet gear of the second planetary-gear mechanism, rotation of the other planet gear of the second planetary-gear mechanism and revolution of this other planet gear, and the carrier that is connected to that other planet gear.

Effect of the Invention

With the present invention that is constructed as described above, it is possible to make a drive apparatus for an electric automobile more compact and simple. In other word, a planetary-gear transmission that comprises a pair of planetary-gear mechanisms is used as the transmission apparatus, so it is possible to divide and transmit the power among a plurality of planet gears, and thus the torque transmission capacity per one planet gear of the pair of planetary-gear mechanisms is kept low. For example, when the number of planet gears of each of the pair of planetary-gear mechanisms (the number of each of the first planet gears, second planet gears and third planet gears) is taken to be 3 to 4, the power that is applied to one planet gear is about three out of ten of the total power that is transmitted by the planetary-gear transmission. Therefore, design should be performed so that the power transmitted per one planet gear be about three out of ten of the maximum total power transmitted by planetary-gear transmission. Moreover, the first sun gear, second sun gear and ring gear transmit power through engagement with the planet gears at a plurality of locations. Therefore, the strength and rigidity required for the teeth of these gears can be kept low compared with the case of transmitting power by engagement between a pair of gears that engage with each other at only one location, and thus it is possible to make the drive apparatus for an electric automobile more compact and lightweight.

Moreover, in the present invention, switching the reduction ratio is performed by switching the second sun gear and the ring gear between a state in which the rotation with respect to a fixed portion is prevented, and a state in which the rotation with respect to the fixed portion is allowed using a pair of braking devices. In other words, in order to switch the reduction ratio, it is not necessary to switch between the disengaged and engaged states of the rotating bodies (for example, rotating shafts, and gears provided in the middle sections in the axial direction of the rotating shafts), so it is possible to make an actuator for a braking device simpler than that of a clutch mechanism having conventional construction. As a result, it is possible to make the drive apparatus for an electric automobile in which a planetary-gear transmission is assembled even more compact and simple. Moreover, it also becomes easier to maintain the torque transmission capacity of each part thereof.

Furthermore, as in the preferred aspect of the present invention, by making the step ratio, which is a value obtained by dividing the reduction ratio in the low-speed mode state by the reduction ratio in the high-speed mode state, 2 or close to 2, it is possible to sufficiently and effectively improve the accelerating performance and high-speed performance of a vehicle. In other words, in a typical electric motor for an electric automobile, the ratio between the maximum rotational speed in the state of maximum torque output and the overall maximum rotational speed of the motor is about 1:2. On the other hand, in order to obtain the equivalent driving performance as a gasoline engine automobile in which a typical transmission is installed, it is preferred that the ratio between the maximum rotational speed in the state of maximum torque output and the overall maximum rotational speed be 1:4. Therefore, when using a typical electric motor for an electric automobile, by making the relationship between the reduction ratio during low-speed operation and the reduction ratio during high-speed operation about 2:1, characteristics such as illustrated by the continuation of the left half section and right half section of the solid line "a" in FIG. 19 are obtained, and it is possible to obtain smooth accelerating performance and high-speed performance that is close to that of a gasoline engine automobile in which a typical transmission is installed such as illustrated by the dashed line "d" in FIG. 19.

MODES FOR CARRYING OUT THE INVENTION

First Example

Figure 1:
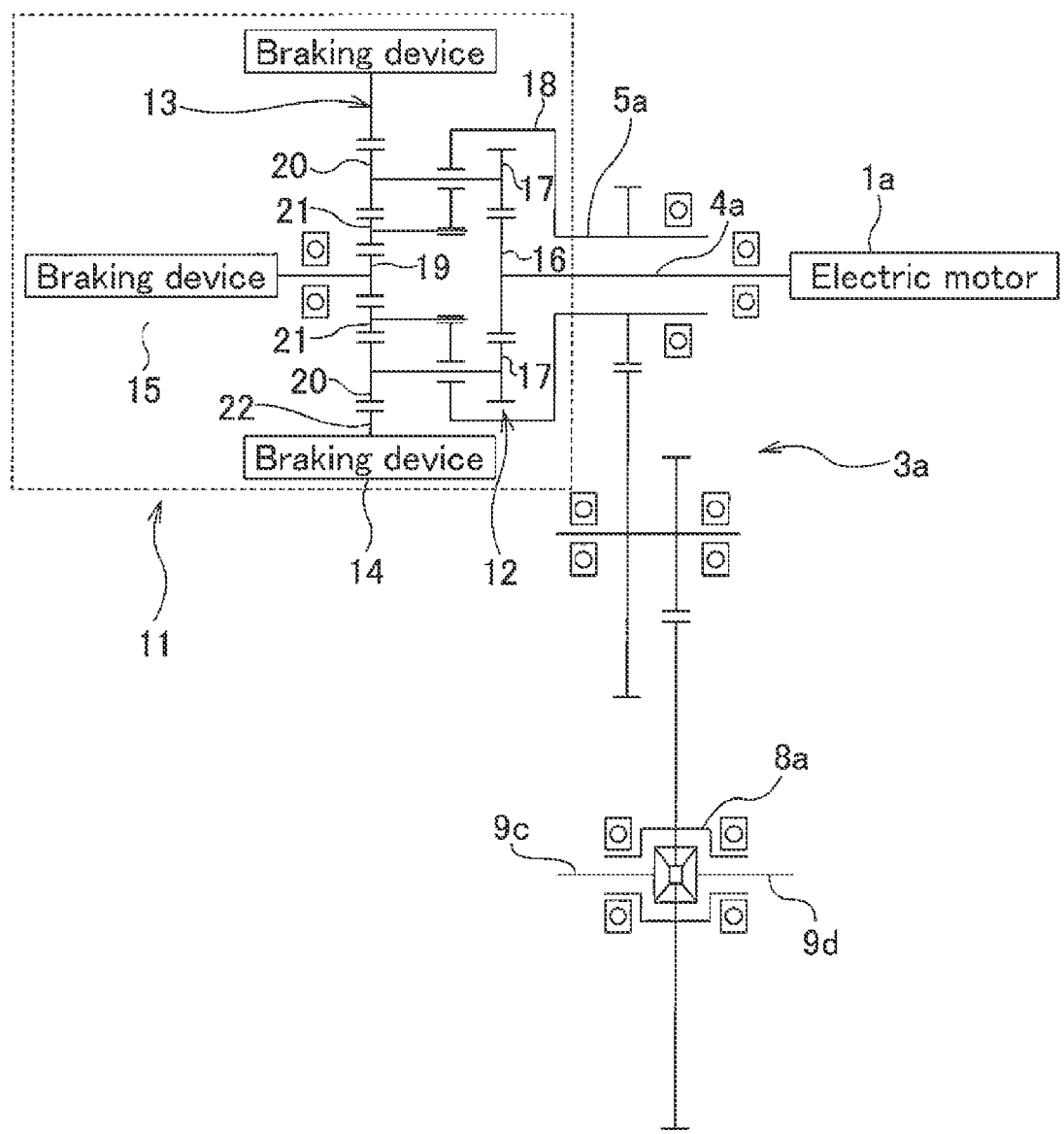
FIG. 1 is a cross-sectional drawing schematically illustrating a first example of an embodiment of the present invention.
Figure 2:
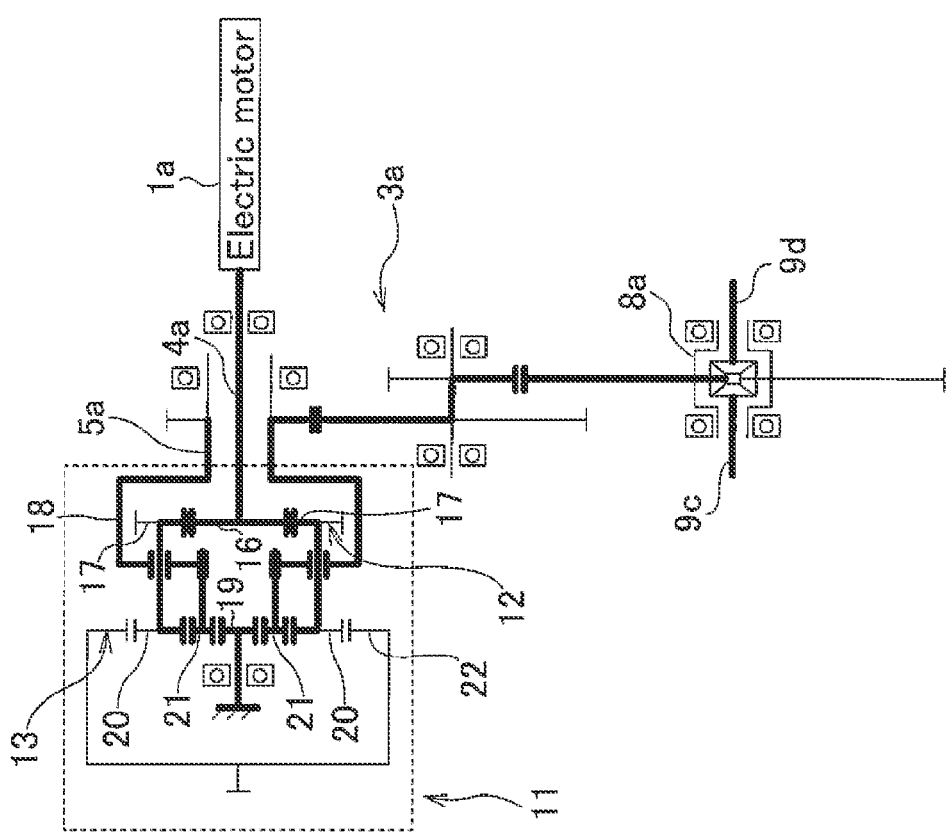
FIG. 2A is a cross-sectional drawing schematically illustrating the state of transmitting torque in a low-speed mode.
FIG. 2B is a cross-sectional drawing schematically illustrating the state of transmitting torque in a high-speed mode.
Figure 2:
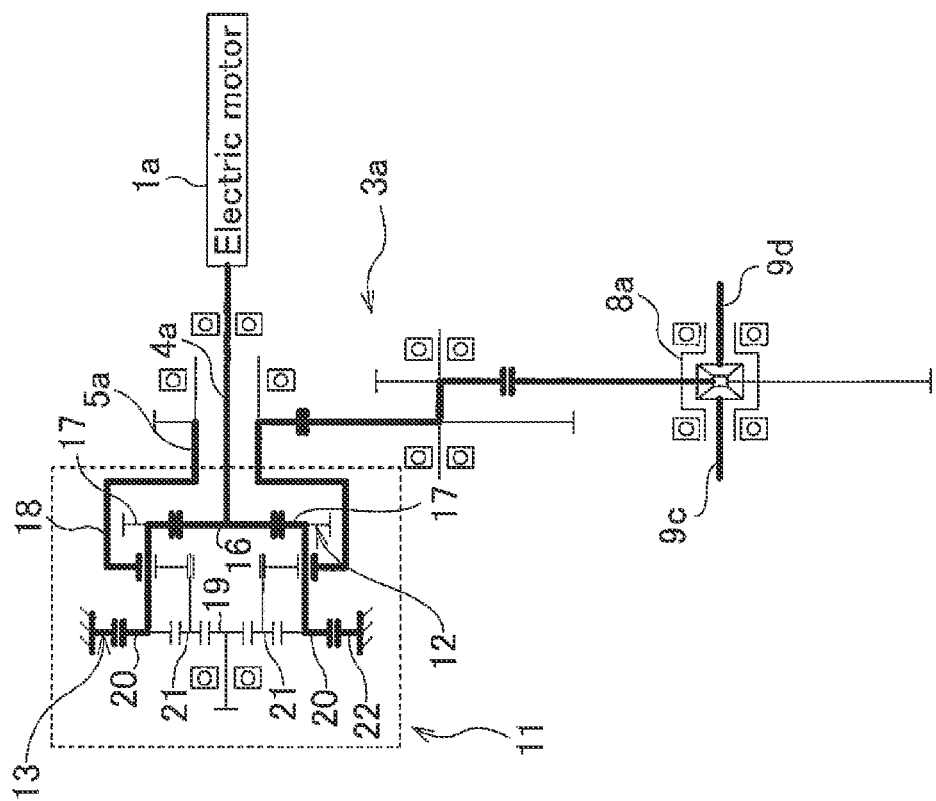

FIG. 1 to FIG. 2B illustrate a first example of an embodiment of the present invention. The drive apparatus for an electric automobile of this example has an electric motor $1a$, a planetary-gear transmission 11 and a rotation transmission apparatus $3a$. The electric motor $1a$, by way of the output shaft thereof, rotates and drives a drive-side rotating shaft $4a$ of the planetary-gear transmission 11 that is concentric with the output shaft.

The planetary-gear transmission 11 is located between the electric motor $1a$ and the rotation transmission apparatus $3a$, and after reducing the power of the electric motor $1a$ by a specified reduction ratio, transmits that power to the rotation transmission apparatus $3a$ by way of a hollow tube shaped driven-side rotating shaft $5a$. The planetary-gear transmission 11 comprises a drive-side rotating shaft 4a and driven-side rotating shaft 5a that are concentric with the output shaft of the electric motor 1a, a first planetary-gear mechanism 12 and second planetary-gear mechanism 13, a ring gear 22, a first braking device 14 and a second braking device 15.

The first planetary-gear mechanism 12 comprises a first sun gear 16, a plurality (for example, three to four) of first planet gears 17, and a carrier 18. The first planetary-gear mechanism 12 has single-pinion construction in which the first planet gears 17 that are supported by the carrier 18 so as to be able to rotate, are caused to engage with the first sun gear 16. The first sun gear 16 is provided on the end section (left end section in FIG. 1) of the drive-side rotating shaft 4a, and is rotated and driven by the drive-side rotating shaft 4a. It is also possible to provide a speed reducer such as a friction-roller reducer between the electric motor 1a and the drive-side rotating shaft 4a of the planetary-gear transmission 11. By installing this kind of speed reducer, it is possible to use a compact and high-rpm electric motor and perform control so as to efficiently keep the operating speed of the planetary-gear transmission 11 at a proper value.

The second planetary-gear mechanism 13 comprises a second sun gear 19, a plurality (same number as the number of first planet gears) of second planet gears 20 that are provided on the outer-diameter side concentric with the first planet gears 17 and that rotate in synchronization with the first planet gears 17, the same number of third planet gears 21 as second planet gears 20, and a carrier 18 that is common with the first planet gears. The second planetary-gear mechanism 13 has double-pinion construction in which together with causing the pair of second planet gears 20 and third planet gears 21, which are supported by the carrier 18 so as to be able to rotate, to engage with each other, causes the third planet gears 21 to engage with the second sun gear 19. In this example, the pitch diameter and number of teeth of the first planet gears 17 and second planet gears 20 is the same, and by providing these gears so as to be continuous (integrated) in the axial direction, a long pinion gear is formed. Moreover, the carrier 18 is provided so as to transmit power to the driven-side rotating shaft 5a. In other words, the driven-side rotating shaft 5a is rotated and driven by the rotation of the carrier 18.

In this example, the ring gear 22 engages with the outer-diameter side second planet gears 20.

The first braking device 14 is provided between the ring gear 22 and the fixed portion (not illustrated in the figure) of the casing in which the transmission is housed. The first braking device 14 controls the actuator such that, by switching the operating (disengaged and engaged) state of the first braking device 14, the ring gear 22 is switched between a state of being prevented from rotating with respect to the fixed portion, and a state of being allowed to rotate (idle). Similarly, the second braking device 15 is provided between the second sun gear 19 and the fixed portion, and controls the actuator such that, by switching the operating (disengaged and engaged) state of the second braking device 15, the second sun gear 19 is switched between a state of being prevented from rotating with respect to the fixed portion, and a state of being allowed to rotate (idle). The construction of the actuator that is used in the first braking device 14 and second braking device 15 is not particularly specified. In other words, not only can a mechanical actuator be used, but a hydraulic actuator or electric actuator can also be used.

Moreover, the rotation transmission apparatus 3a is a typical gear transmission in which a plurality of gears are combined, and is constructed such that the rotation of the driven-side rotating shaft 5a of the planetary-gear transmission 11 is transmitted to the input section of a differential gear 8a, and a pair of left and right drive wheels are rotated and driven by the output shafts 9c, 9d of the differential gear 8a by way of a universal joint.

In the planetary-gear transmission 11 of the drive apparatus for an electric automobile of this example, by switching the operating (disengaged and engaged) state of the first braking device 14 and second braking device 15, operation is possible in either a low-speed state having a large reduction ratio between the drive-side rotating shaft 4a and the driven-side rotating shaft 5a, or a high-speed mode having a small reduction ratio. In other words, in the low-speed mode having a large reduction ratio, the first braking device 14 operates and the second braking device 15 is released. In this case, the first braking device 14 is in the engaged state, rotation of the ring gear 22 is prevented, the second braking device 15 is in the disengaged state and rotation of the second sun gear 19 is allowed (the second sun gear 19 idles), and thus the low-speed mode state is achieved.

On the other hand, in the high-speed mode having a small reduction ratio, the first braking device 14 is released, and the second braking device 15 operates. In this case, the first braking device 14 is in the disengaged state, the ring gear 22 is allowed to rotate (the ring gear 22 idles), the second braking device 15 is in the engaged state and rotation of the second sun gear 19 is prevented, and thus the high-speed mode is achieved.

In the low-speed mode state, as illustrated by the bold line in FIG. 2A, rotation of the ring gear 22 is prevented, and rotation of the second sun gear 19 is allowed. The power from the electric motor 1a in the low-speed mode is transmitted to the driven-side rotating shaft 5a along the path "(A) electric motor 1a→drive-side rotating shaft 4a→first sun gear 16→rotating movement of the first planet gears 17→rotating movement of the second planet gears 20→revolving movement of the second planet gears 20 due to engage with the ring gear 22→carrier 18→driven-side rotating shaft 5a".

In the low-speed mode state, the power from the electric motor 1a that is transmitted to the first planet gears 17 by way of the first sun gear 16 is transmitted to the carrier 18 by way of the second planet gears 20 that revolve while rotating due to the engagement with the ring gear 22. In this way, in the low-speed mode state, by transmitting power by way of the second planet gears 20 that revolve while rotating due to engagement with the ring gear 22 having a large pitch diameter and a large number of teeth, it is possible to increase the reduction ratio of the planetary-gear transmission 11.

The reduction ratio $i_L$ in the low-speed mode state, when the number of teeth of the first sun gear 16 is taken to be $Z_{16}$, and the number of teeth of the ring gear 22 is taken to be $Z_{22}$, is expressed by the following Equation 1.

$$i_L = \frac{Z_{16}}{Z_{16} + Z_{22}} \quad \text{[Equation 1]}$$

On the other hand, in the high-speed mode state, as illustrated by the bold line in FIG. 2B, rotation of the ring gear 22 is allowed, and rotation of the second sun gear 19 is prevented. In the high-speed mode state, power from the electric motor 1a is transmitted to the driven-side rotating shaft 5a along the path "(B) electric motor 1a→drive-side rotating shaft 4a→first sun gear 16→rotating movement of the first planet gears 17→rotating movement of the second planet gears 20→rotating movement of the third planet gears 21→revolving movement of the third planet gears 21 due to engagement with the second sun gear 19→carrier 18→driven-side rotating shaft 5a'''.

In the high-speed mode state, the power from the electric motor 1a that is transmitted to the first planet gears 17 by way of the first sun gear 16 is transmitted to the carrier 18 by way of the third planet gears 21 that revolve while rotating due to engagement with the second sun gear 19. In this way, in the high-speed mode, by transmitting power by way of the third planet gears 21 that revolve while rotating due to engagement with the second sun gear 19 that has a small pitch diameter and a small number of teeth, the reduction ratio of the planetary-gear transmission 11 becomes small.

The reduction ratio in the high-speed mode state $i_H$, when the number of teeth of the second sun gear 19 is taken to be $Z_{19}$, is expressed by the following Equation 2.

$$i_H = \frac{Z_{16}}{Z_{16} + Z_{19}} \quad \text{[Equation 2]}$$

Here, in this example, the step ratio I between the low-speed mode state and the high-speed mode state (the value obtained by dividing reduction ratio in low-speed mode state by reduction ratio in the high-speed mode state) is 2 or close to 2. The reduction ratio in the low-speed mode state and the reduction ratio in the high-speed mode state are expressed by Equations 1 and 2 respectively, so the step ratio I is expressed by the following Equation 3.

$$I = \frac{Z_{16} + Z_{22}}{Z_{16} + Z_{19}} \quad \text{[Equation 3]}$$

Therefore, by regulating the number of teeth $Z_{16}$, $Z_{19}$ and $Z_{22}$ for the first sun gear 16, second sun gear 19 and ring gear 22 to appropriate values, it is possible to perform control so that the step ratio I in the planetary-gear transmission 11 of the drive apparatus for an electric automobile of this example is 2 or close to 2. Most preferably, the planetary-gear transmission 11 is designed so that the step ratio is 2. However, even when the value is not strictly 2, but is close to 2, the same level of operating performance as that of a gasoline engine automobile having a typical transmission can be obtained. The case in which the step ratio I is within the range 1.8 to 2.2 is included in the present invention.

In regard to the step ratio I of the planetary-gear transmission 11 of this example, an example using detailed values will be given. In this example, the number of teeth $Z_{16}$ of the first sun gear 16, the number of teeth $Z_{17}$ (=$Z_{20}$) of the first planet gears 17 (and second planet gears 20), the number of teeth $Z_{19}$ of the second sun gear 19, the number of teeth $Z_{21}$ of the third planet gears 21, and the number of teeth $Z_{22}$ of the ring gear 22 are regulated as below.

$Z_{16}$=31
$Z_{17}$=17
$Z_{19}$=15
$Z_{21}$=19
$Z_{22}$=65

The reduction ratio $i_L$ in the low-speed mode, the reduction ratio $i_H$ in the high-speed mode and the step ratio I that are found from Equation 1 to Equation 3 are as given below.

$i_L$=0.323
$i_H$=0.674
I=2.09

With the drive apparatus for an electric automobile of this example, compact and simple construction of the drive apparatus for an electric automobile is possible, so it is possible to lengthen the distance traveled per charge, and improve the convenience of the electric automobile. In other words, a planetary-gear transmission 11 that has a pair of planetary gear mechanisms as the transmission mechanism is used, and the power is divided and transmitted among a plurality of planet gears 17, 20, 21 so the torque transmitted per one of these planet gears (torque transmission capacity) is kept low. Moreover, the first sun gear 16 transmits power through the engagement in a plurality of locations with the first planet gears 17, the ring gear 22 transmits power through the engagement in a plurality of locations with the second planet gears 20, and the second sun gear 19 transmits power through engagement in a plurality of locations with the third planet gears 31. Therefore, the strength and rigidity that are required for the teeth of the first sun gear 16, second sun gear 19 and ring gear 22 can be kept lower than that of the case of transmitting power though engagement at only one located by a pair of gears 10a, 10c (10b, 10d) as in the conventional construction. As a result, when compared with the case of using a transmission mechanism using a typical gear mechanism, it is possible to make the transmission mechanism more compact and lightweight.

Moreover, the planetary-gear transmission 11 selects the low-speed mode or high-speed mode having different reduction ratios by controlling the first braking device 14 and second braking device 15 in order to switch whether or not rotation of the ring gear 11 and second sun gear 19 will be allowed. In this example, these braking devices switch whether or not rotation of the second sun gear 19 and ring gear 22 will rotate with respect to a portion (fixed portion) that is also stationary, and do not have to switch whether or not there is relative rotation between rotating members (rotating shaft and gears) as in the conventional construction. Therefore, it is possible to use an actuator that is compact and that generates large force such as a hydraulic actuator as the actuators for switching between the disengaged and engaged state of these braking devices, and thus it is possible to simplify the construction of a drive apparatus for an electric automobile in which a planetary-gear transmission 11 is assembled, while at the same time maintain the torque transmission capacity.

Moreover, by regulating the number of teeth $Z_{16}$, $Z_{19}$ and $Z_{22}$ of the first sun gear 16, second sun gear 19 and ring gear 22 to proper values, it is possible to make the step ratio between the low-speed mode and high-speed mode 2 or close to 2. As a result, in a drive apparatus for an electric automobile that uses an electric motor 1a, performance that is equivalent to that of a gasoline engine automobile in which a typical transmission is installed is obtained, and thus it is possible to improve the accelerating performance and high-speed performance of the automobile.

Second Example

Figure 3:
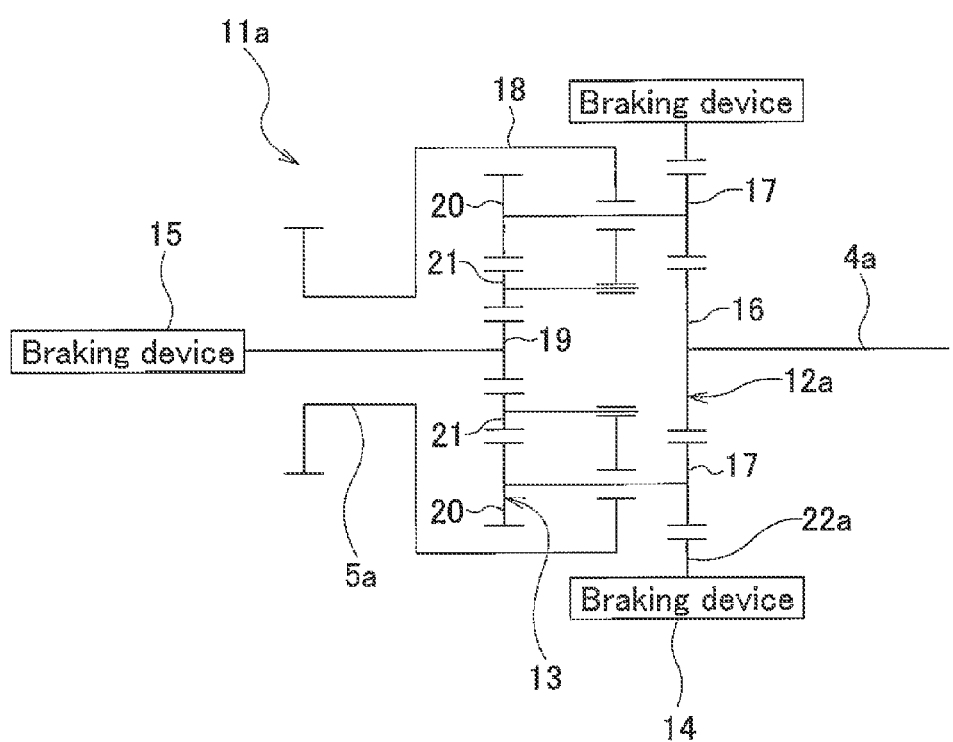
FIG. 3 is a cross-sectional drawing schematically illustrating a second example of an embodiment of the present invention, with a planetary gear transmission take out.

FIG. 3 illustrates a second example of an embodiment of the present invention. The planetary-gear transmission 11a of the drive apparatus for an electric automobile of this example causes a ring gear 22a to engage with first planet gears 17 of a single-pinion first planetary-gear mechanism 12a. The construction and function of other parts are the same as in the first example of an embodiment.

Third Example

Figure 4:
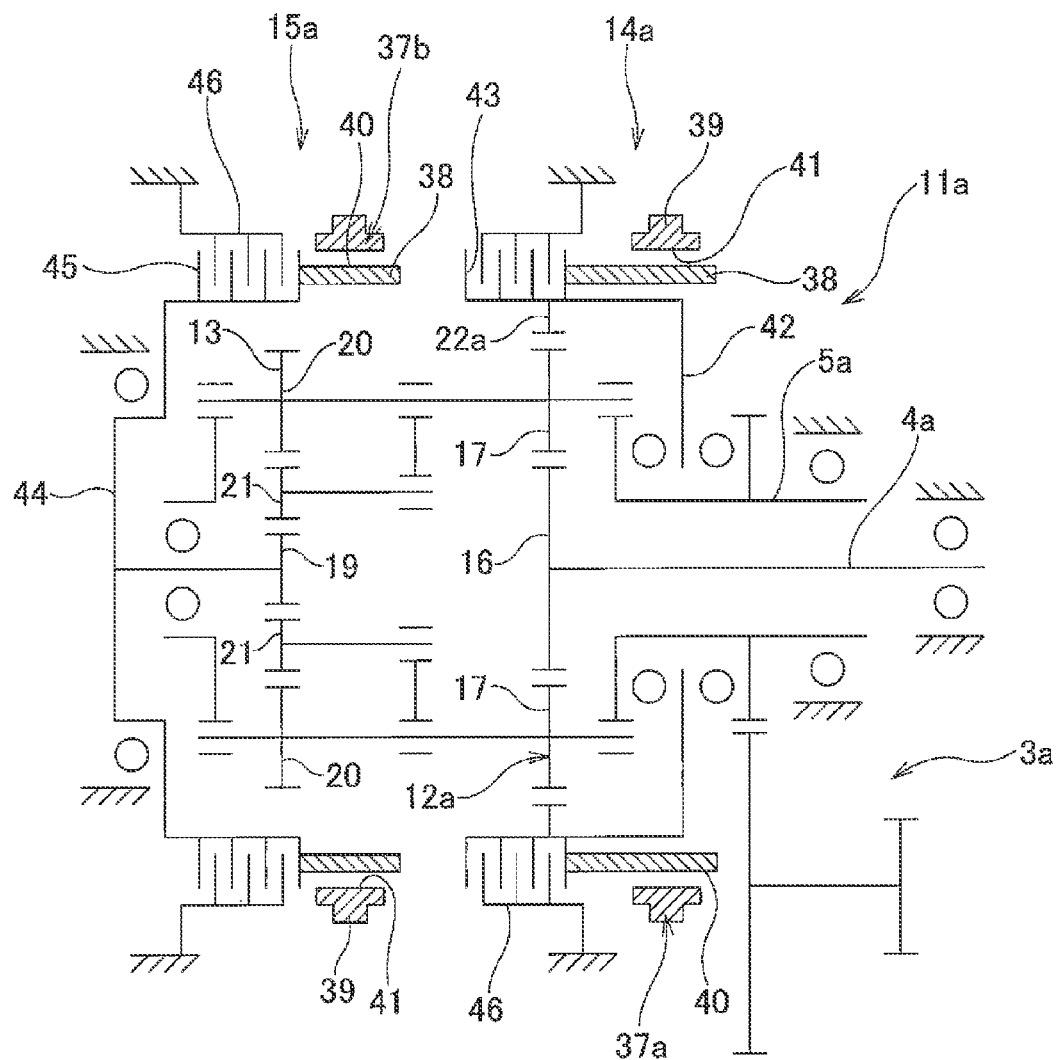
FIG. 4 is a cross-sectional drawing schematically illustrating a third example of an embodiment of the present invention.
Figure 5:
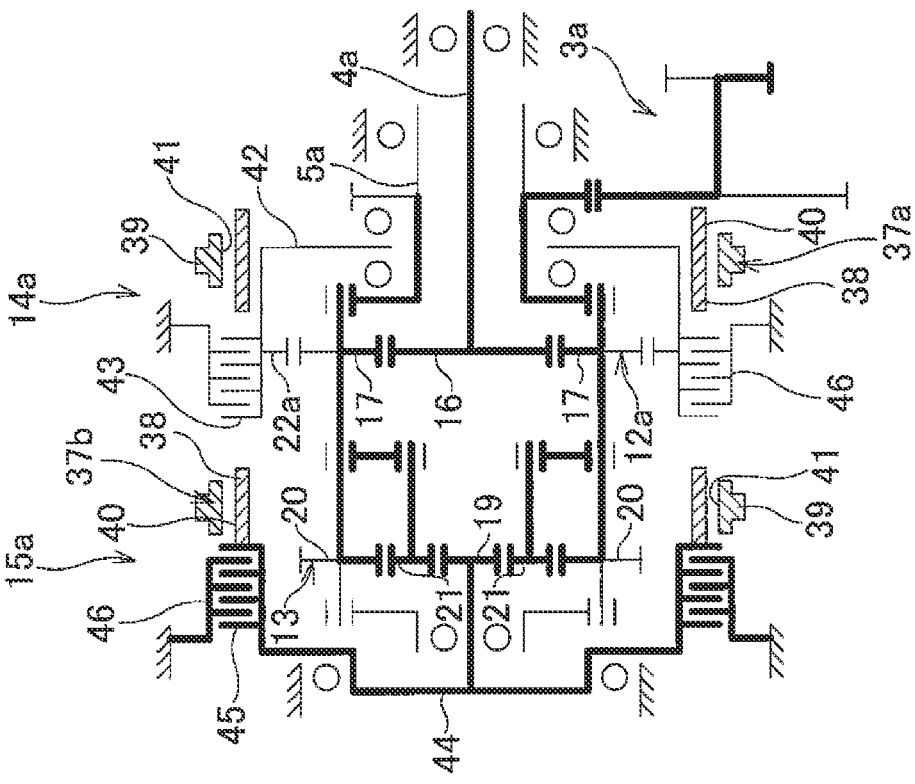
FIGS. 5A and 5B are drawings similar to FIGS. 2A and 2B, and schematically illustrate the third example.
Figure 5:
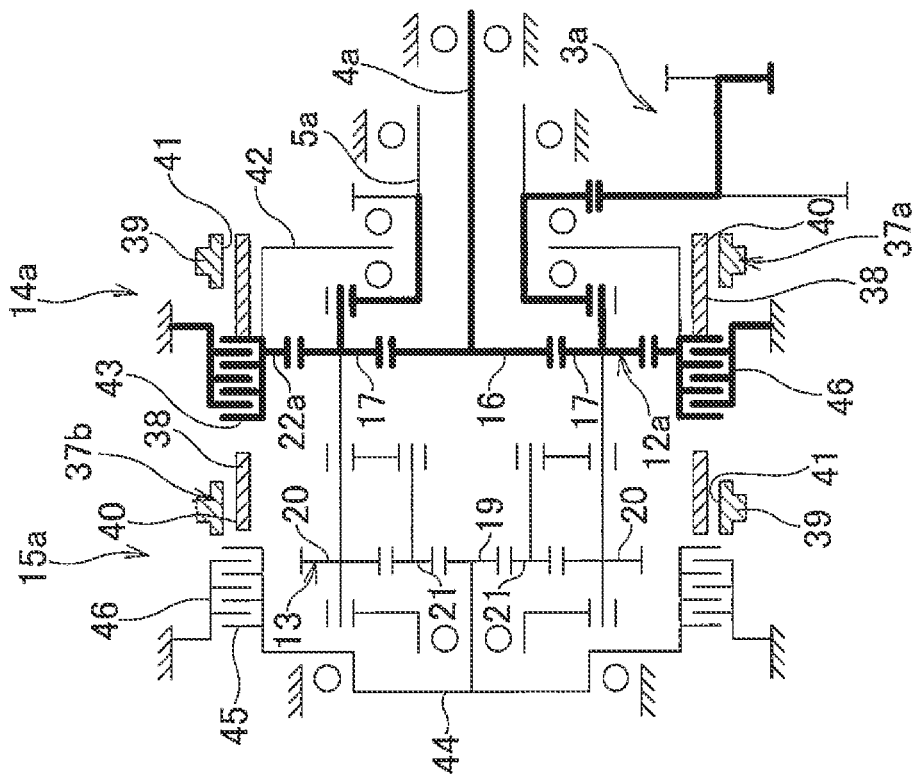
Figure 6:
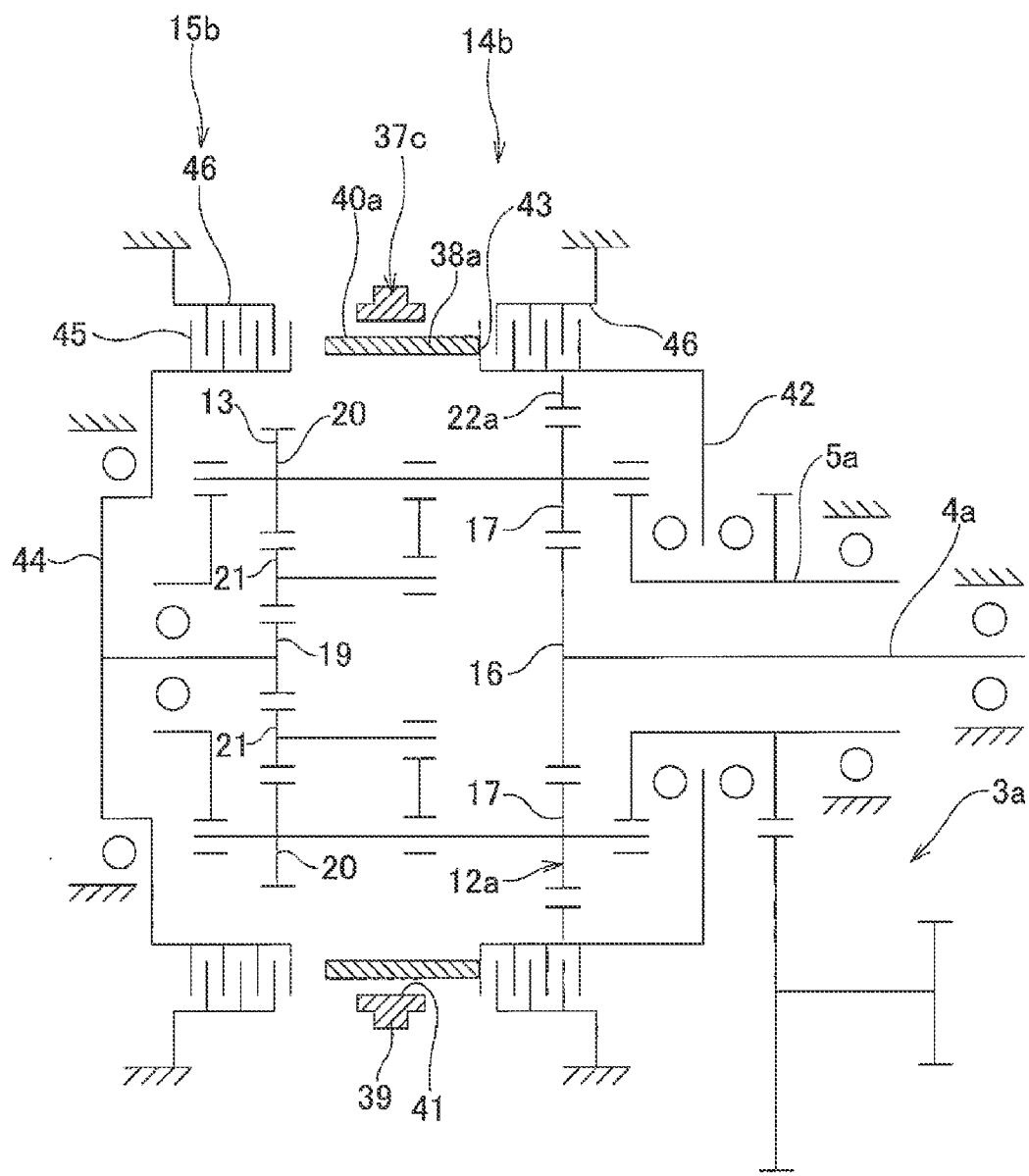
FIG. 6 is a cross-sectional drawing schematically illustrating a fourth example of an embodiment of the present invention.
Figure 7:
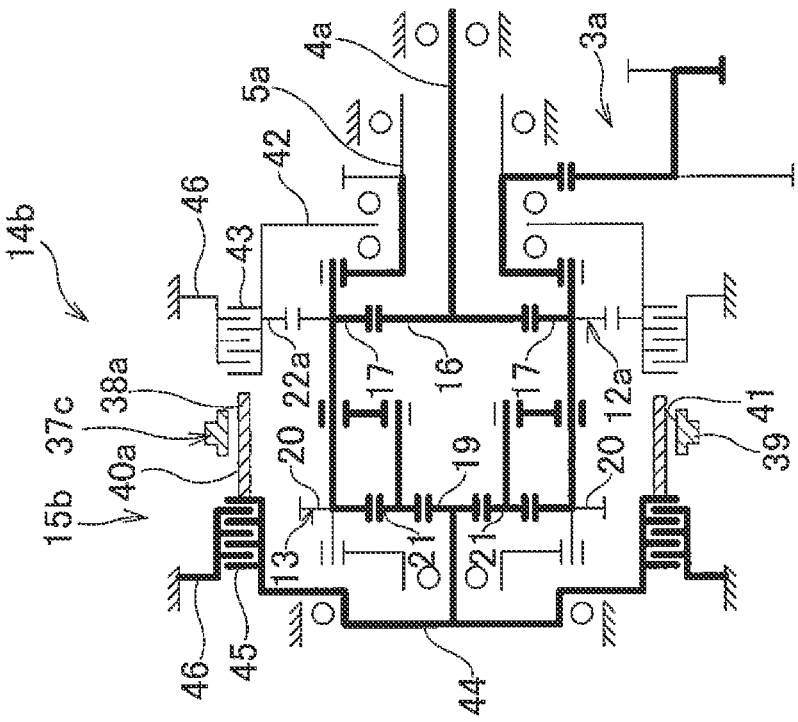
FIGS. 7A and 7B are drawings similar to FIGS. 2A and 2B, and schematically illustrate the fourth example.
Figure 7:
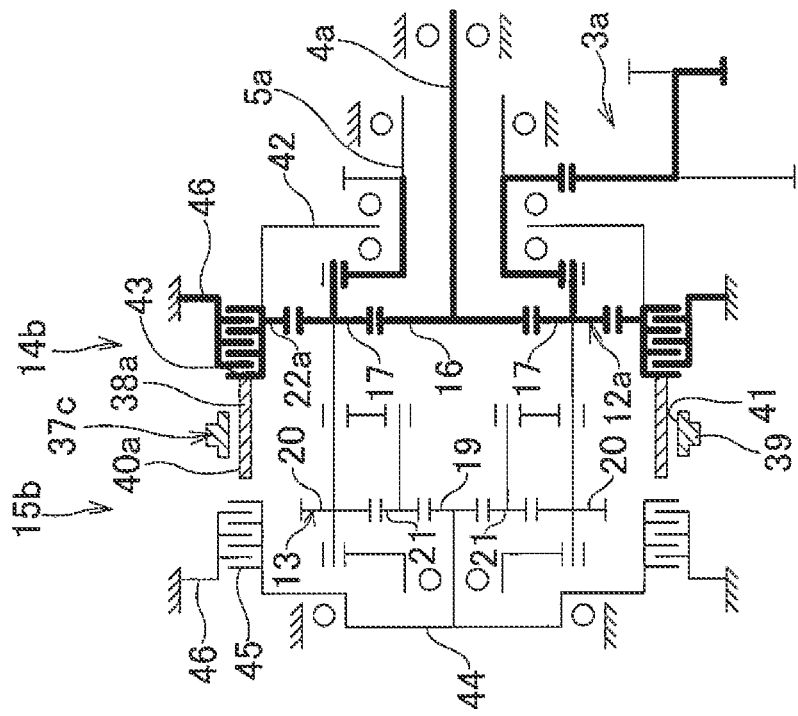
Figure 8:
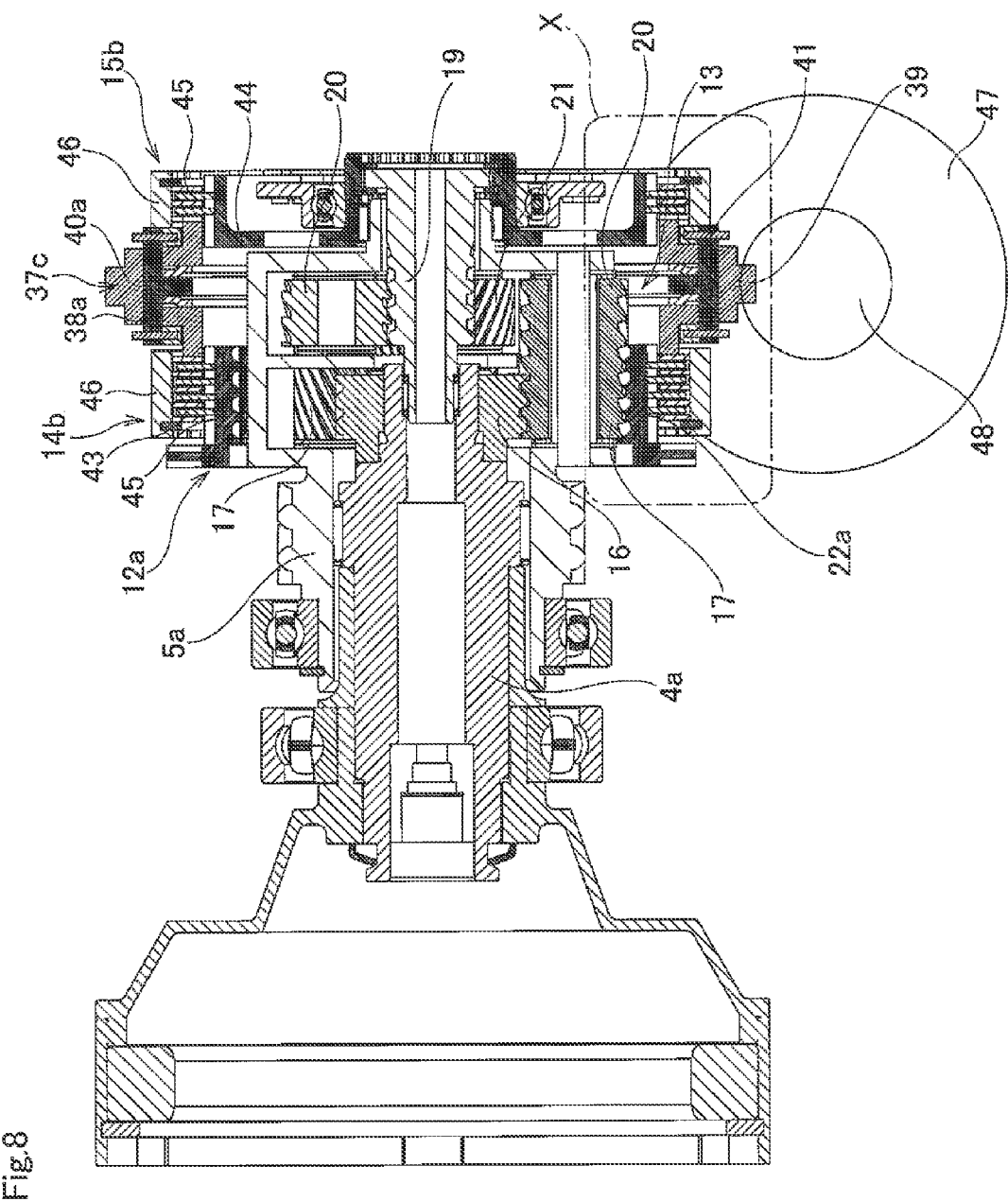
FIG. 8 is a cross-sectional drawing illustrating the fourth example.
Figure 9:
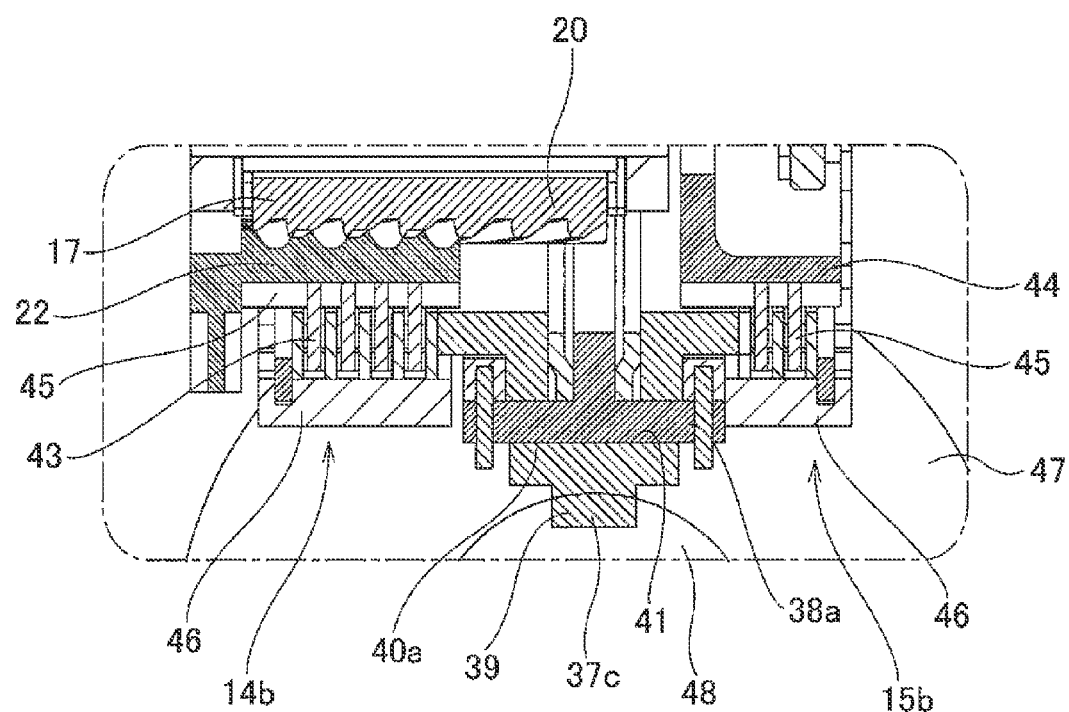
FIG. 9 is an enlarged view of section X in FIG. 8.
Figure 10:
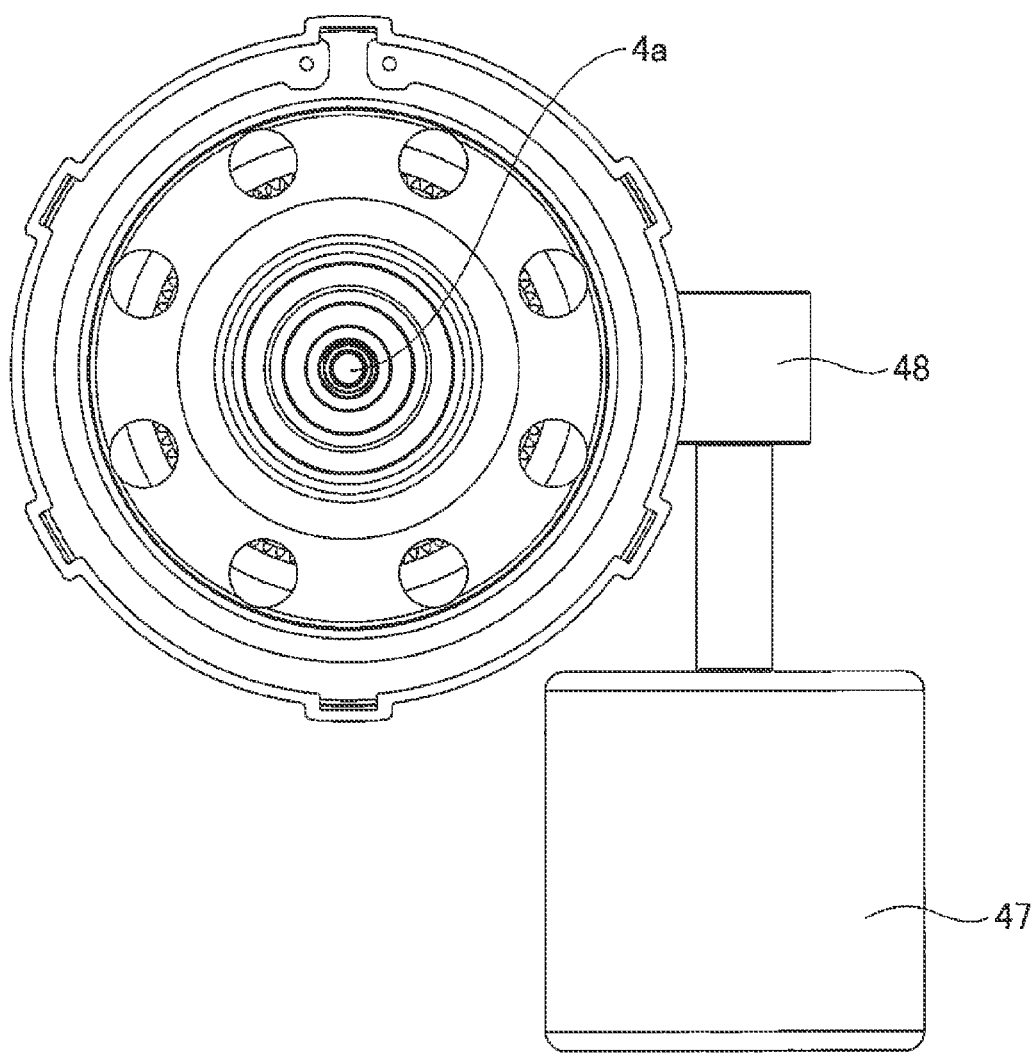
FIG. 10 is an end view illustrating the fourth example as seen from the right in FIG. 8.
Figure 11:
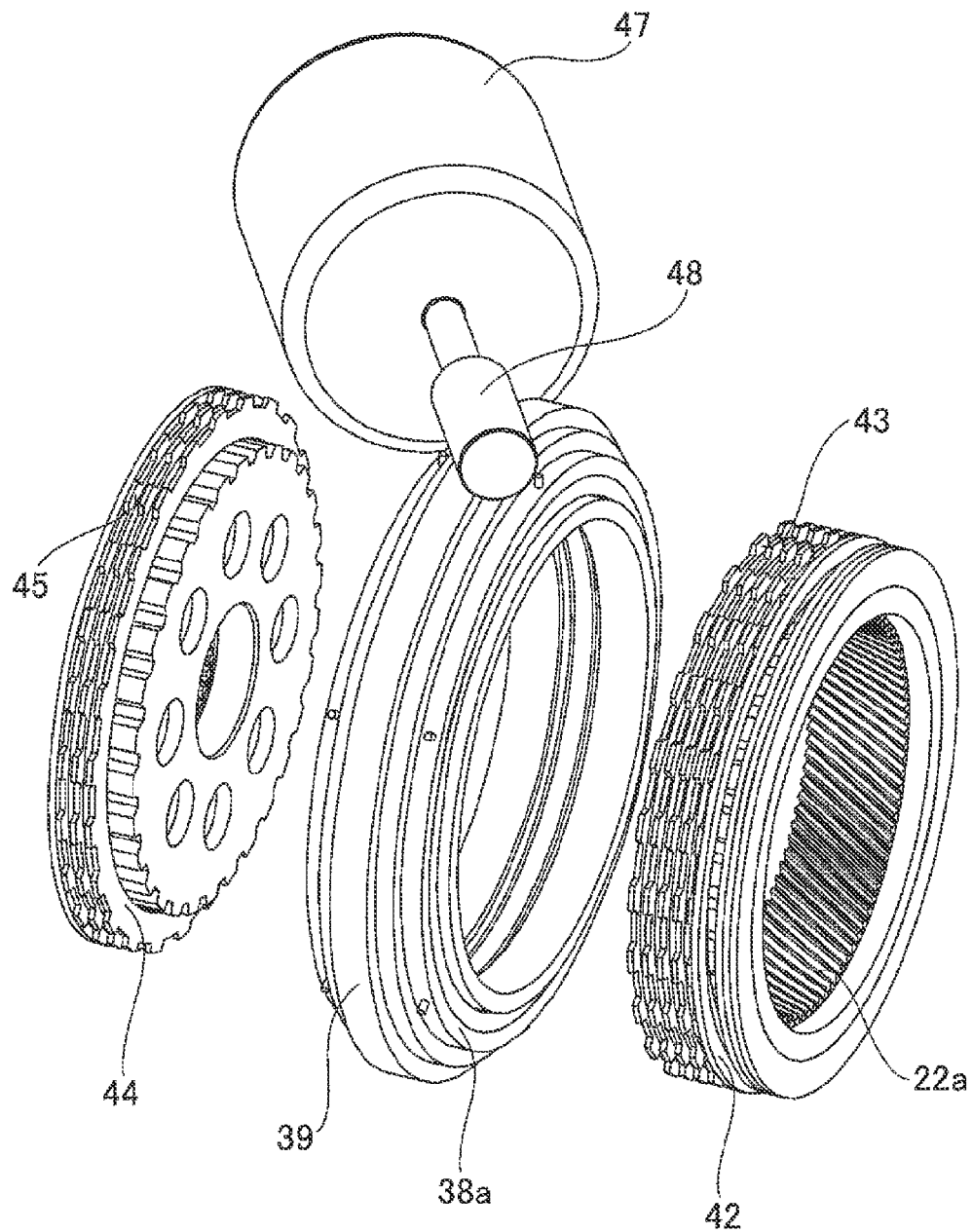
FIG. 11 is a perspective drawing illustrating the fourth example with the main parts taken out.
Figure 12:
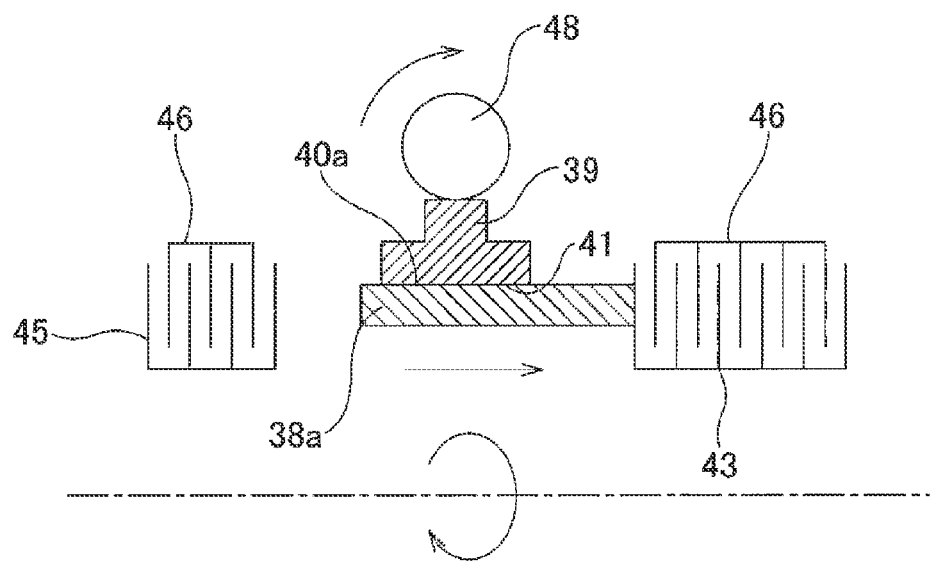
FIGS. 12A and 12B are schematic drawings of the fourth example for explaining the operation of an actuator.
Figure 12:
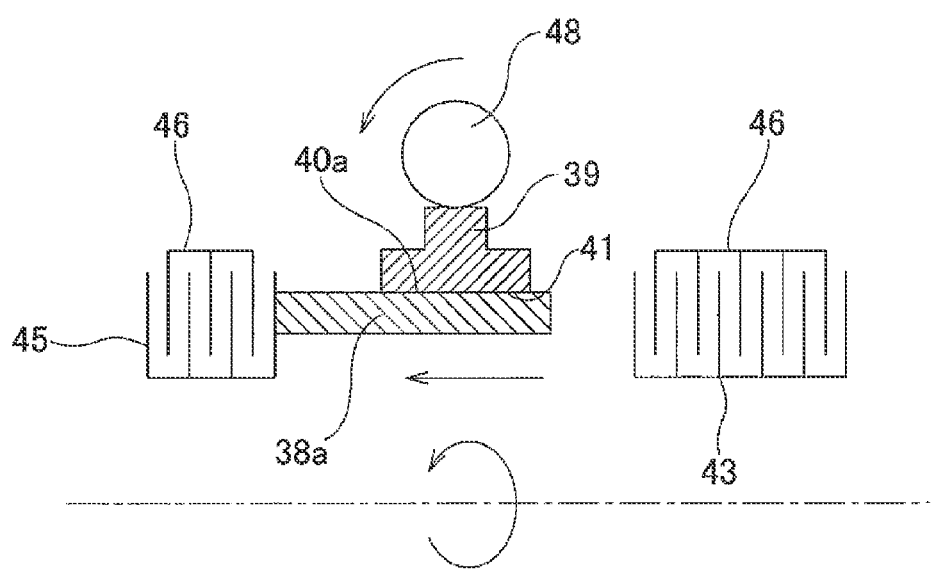

FIG. 4 to FIG. 5 illustrates a third example of an embodiment of the present invention. In this example, electric type actuators 37a, 37b that convert the rotating drive force of the servo motor to thrust in the axial direction are used as actuators for switching the operating state of the first braking device 14a and second braking device 15a. In other words, the actuators 37a, 37b have a servo motor (not illustrated in the figure), a piston 38 and worm wheel 39. The piston 38 has a male screw section 40 around the outer circumferential surface of the middle section in the axial direction, and with rotation prevented, is supported inside the casing that houses the planetary-gear transmission 11a such that only displacement in the axial direction is possible. Moreover, the worm wheel 39 engages with a worm gear (not illustrated in the figure) that is supported by and fastened to the output shaft of the servo motor, the entire worm wheel 39 having a circular ring shape, and with displacement in the axial direction prevented, is supported inside the casing so that only rotation is possible. Furthermore, a female screw section 41 that engages with the male screw section 40 is formed around the inner circumferential surface of the worm wheel 41. In this example, the actuators 37a, 37b are provided in the middle section in the axial direction of the planetary-gear transmission 11a, so the piston 38 is cylindrical shaped, and the members of the planetary-gear transmission 11a are placed on the inner-diameter side thereof. However, in case that both or one of the actuators 37a, 37b is placed at a portion adjacent to the planetary-gear transmission 11a, the piston of the actuator can be column shaped.

In this example, during operation of the actuator 37a (37b), the output shaft of the servo motor rotates in a specified direction and rotates and drives the worm wheel 39. Due to engagement between the male screw section 40 and the female screw section 41, the tip end section of the piston 38 presses a first friction engaging section 43, which is a rotating-side friction plate of a multi-plate wet clutch, that is provided in a first rotating member 42 that is supported so as to be able to rotate in synchronization with the ring gear 22a (or a second friction engaging section 45, which is a rotating friction plate of a multi-plate wet clutch, that is provided in a second rotating member 44 that is supported so as to be able to rotate in synchronization with the second sun gear 19), against a fixed portion 46 (left in FIGS. 4 and 5) that is provided on a non-rotating side friction plate of a multi-plate wet clutch, which is a member that is assembled inside the casing that houses the planetary-gear transmission 11a and is prevented from rotating. The first friction engaging section 43 (or second friction engaging section 45) is brought into friction engagement with the fixed portion 46, which prevents rotation of the ring gear 22a (or second sun gear 19). On the other hand, when rotation of the ring gear 22a (or second sun gear 19) is allowed to rotate, the output shaft of the servo motor rotates in a direction opposite the specified direction, and the piston 38 is displaced in a direction that releases the force with which the tip end section of the piston 38 presses the first friction engaging section 43 (or second friction engaging section 45). As a result, the rotation of the ring gear 22a (or second sun gear 19) is allowed.

In the case of operating the drive apparatus for an electric automobile of this example in the low-speed mode state in which the reduction ratio between the drive-side rotating shaft 4a and the driven-side rotating shaft is large, as illustrated in FIG. 5A, a control unit (not illustrated in the figure) allows the servo motor of one actuator 37a of the actuators 37a, 37b to rotate in a specified direction, and prevents rotation of the ring gear 22a with respect to the fixed portion 46, allows the servo motor of the other actuator 37b to rotated in the opposite direction of the specified direction and allows rotation of the second sun gear 19. On the other hand, in the case of operation in the high-speed mode having a small reduction ratio, as illustrated in FIG. 5B, the control unit allows the servo motor of one actuator 37a to rotate in the opposite direction of the specified direction, allows rotation of the ring gear 22a, allows the servo motor of the other actuator 37b to rotate in the specified direction, and prevents rotation of the second sun gear 19.

In this example, rotation of the output shaft of the servo motor is converted to thrust in the axial direction of the piston 38 due to the engagement between the worm gear, which is supported by and fastened to the output shaft, and the worm wheel 39, and engagement between the male screw section 40 of the piston 38 and the female screw section 41 of the worm wheel 39. The thrust force in the axial direction causes the tip end surface of the piston 38 to press the first friction engaging section 43 (or second friction engaging section 45) against the fixed portion 46, causing friction engagement between the first friction engaging section 43 (or second friction engaging section 45) and the fixed portion 46. In this state, due to the engagement between the worm gear and worm wheel 39 and engagement between the male screw section 40 and the female screw section 41, the first friction engaging section 43 (or second friction engaging section 45) is suppressed from displacement in a direction that would release the force by which the first friction engaging section 43 (or second friction engaging section 45) is pressed against the fixed section 46. Therefore, in the friction engagement state between the first friction engaging section 43 (or section friction engaging section 45) and the fixed portion 46, it is not necessary to maintain current flowing to the servo motor, and thus it is possible to prevent wasteful consumption of electric power.

As construction for converting the rotation of the worm wheel 39 to thrust in the axial direction of the piston 38, it is possible to employ a ball-screw mechanism instead of engagement between the male screw section 40 and female screw section 41. In other words, a ball-screw mechanism is formed in which an outer-diameter helical ball-screw groove having a partial arc-shaped cross-sectional shape is formed around the inner circumferential surface of a worm wheel, and a helical ball-screw groove having a partial arc-shaped cross-sectional shape is formed around the outer circumferential surface of a piston, and a plurality of balls is provided between these grooves so as to be able to roll freely. As long as displacement in a direction that releases the force that presses the piston against the friction engaging section is suppressed only with the engagement between the worm gear and worm wheel, by employing a ball-screw mechanism as described above, it is possible to keep the output of the servo motor small when compared with the case of engagement between the male screw section 40 and the female screw section 41, and it is possible to reduce the power consumption of the servo motor and make the servo motor more compact. The construction and functions of the other parts of this example are the same as in the second example of an embodiment.

Fourth Example

FIG. 6 to FIG. 12 illustrate a fourth example of an embodiment of the present invention. In this example, construction is such that the operating state of the first braking device 14b and second braking device 15b is switched by a single actuator 37c. Therefore, the actuator 37c of this example has a male screw section 40a that is provided around the outer circumferential surface of the middle section in the axial direction of the piston 38a. This male screw section 4a engages with a female screw section 41 that is provided around the inner circumferential surface of the worm wheel 39. Moreover, a first braking device 14*b* and second braking device 15*b* are located on opposite sides in the axial direction from each other with respect to the actuator 37*c*. Therefore, the first friction engaging section 43 and second friction engaging section 45 of the first braking device 14*b* and second braking device 15*b* face both end surfaces in the axial direction of the piston 38*a*.

When operating in the low-speed mode state having a large reduction ratio, the drive apparatus for an electric automobile of this example, as illustrated in FIG. 12A, rotates the output shaft of the servo motor 47 in a specified direction (clockwise direction in FIG. 12A), and rotates and drives a worm wheel 39 due to the engagement with a worm gear 48 that supported by and fastened to the output shaft of the servo motor 47. As a result, the piston 38*a* displaces due to the engagement between the male screw section 40*a* and the female screw section 41, in a direction (right direction in FIG. 12A) such that one end section (right end section in FIG. 12A) in the axial direction of the piston 38*a* presses the first friction engaging section 43 against the fixed portion 46, and such that the force by which the other end section (left end section in FIG. 12A) presses the second friction engaging section 45 against the fixed portion 46 is released. In this way, the first friction engaging section 43 has a friction fit with the fixed portion 46, and together with preventing rotation of the ring gear 22*a*, allows rotation of the second sun gear 19.

On the other hand, when operating in the high-speed mode state having a small reduction ratio, the drive apparatus for an electric automobile of this example, as illustrated in FIG. 12B, rotates the output shaft of the servo motor 47 in the opposite direction of the specified direction (counterclockwise direction in FIG. 12B), and rotates and drives the worm wheel 39. As a result, the piston 38*a* displaces due to the engagement between the male screw section 40*a* and the female screw section 41, which releases the force by which the one end section in the axial direction of the piston 38*a* presses the first friction engaging section 43 against the fixed portion 46, and causes the other end section in the axial direction of the piston 38*a* to press the second friction engaging section 45 against the fixed portion 46. In this way, there is a friction fit between the second friction engaging section 45 and the fixed portion 46, which, together with preventing rotating of the second sun gear 19, allows rotation of the ring gear 22*a*.

With the drive apparatus for an electric automobile of this example, the operating state of the first braking device 14*b* and second braking device 15*b* can be switched by a single actuator 37*c*. Therefore, the drive apparatus for an electric automobile can have more compact and simple construction than in the case of the third example of an embodiment, and it is possible to further improve the convenience of an electric automobile. The construction and functions of other parts of this example are the same as in the second and third examples of an embodiment.

Fifth Example

Figure 13:
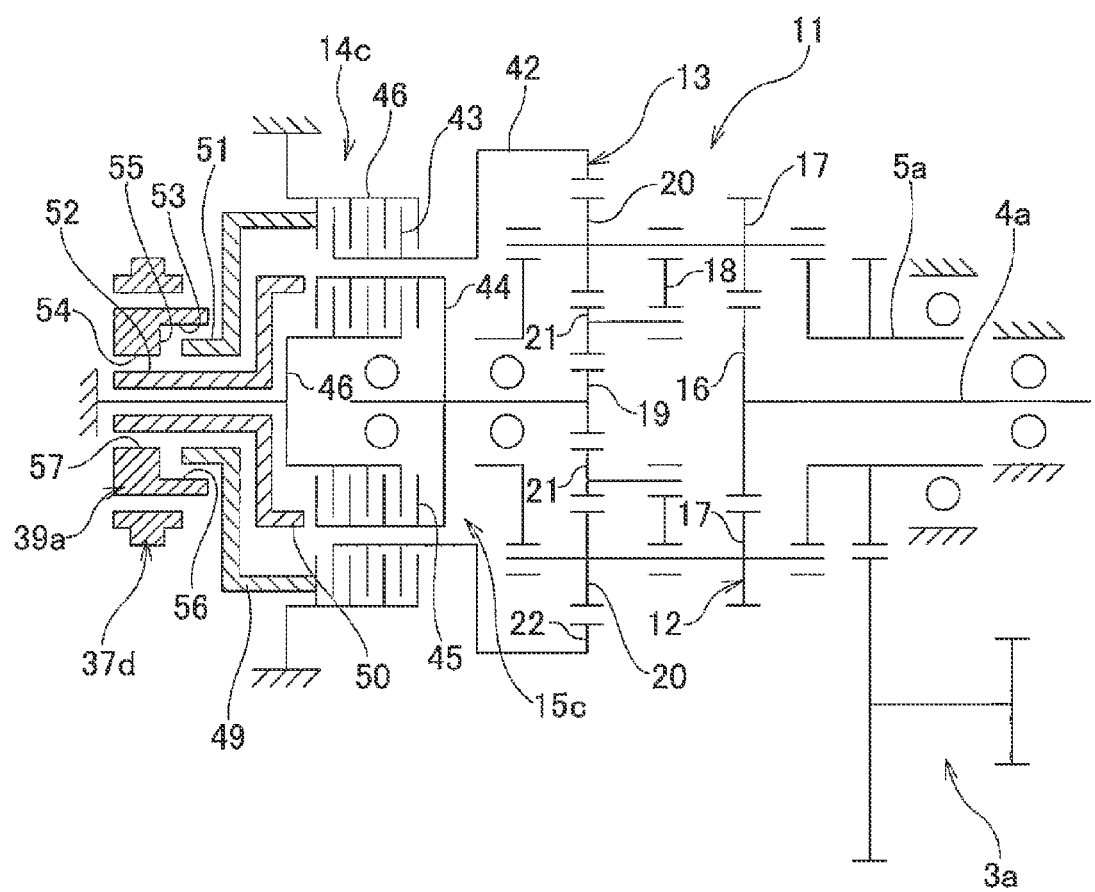
FIG. 13 is a cross-sectional drawing schematically illustrating a fifth example of an embodiment of the present invention.
Figure 14:
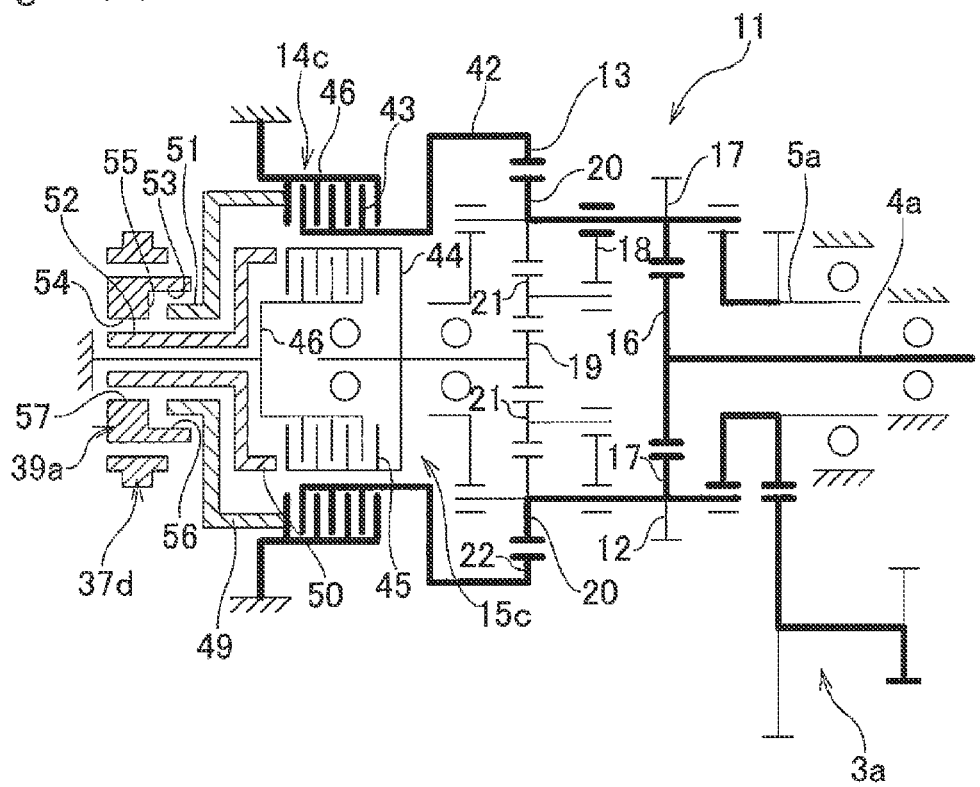
FIGS. 14A and 14B are drawings similar to FIGS. 2A and 2B, and schematically illustrate the fifth example.
Figure 14:
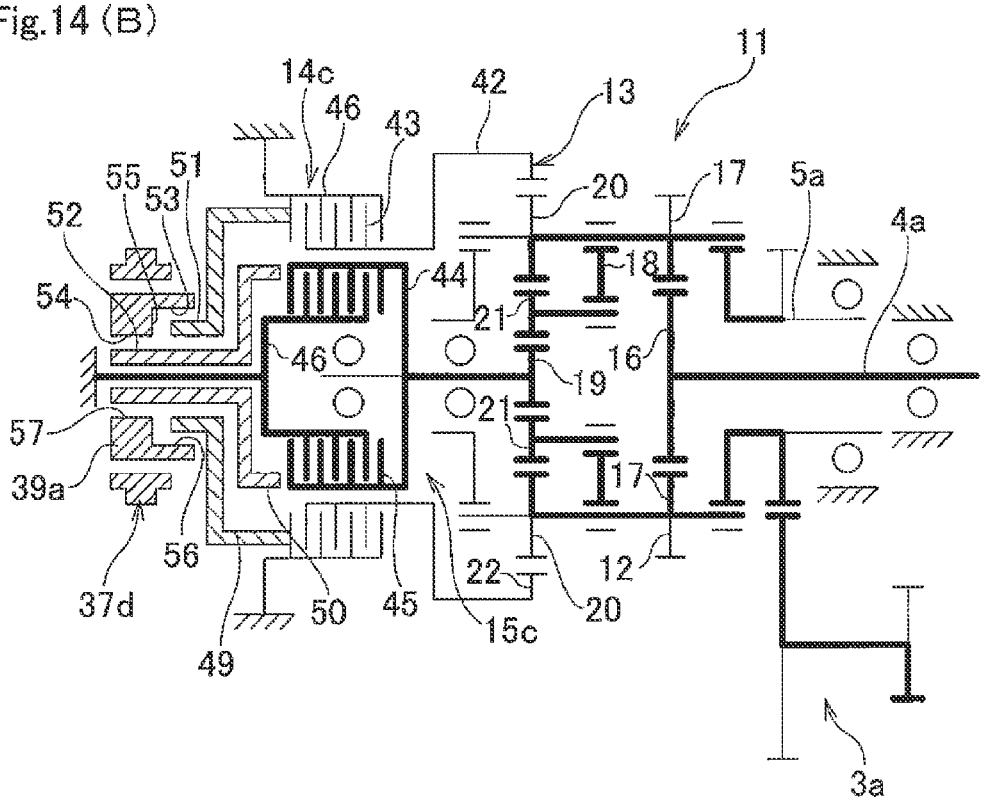
Figure 15:
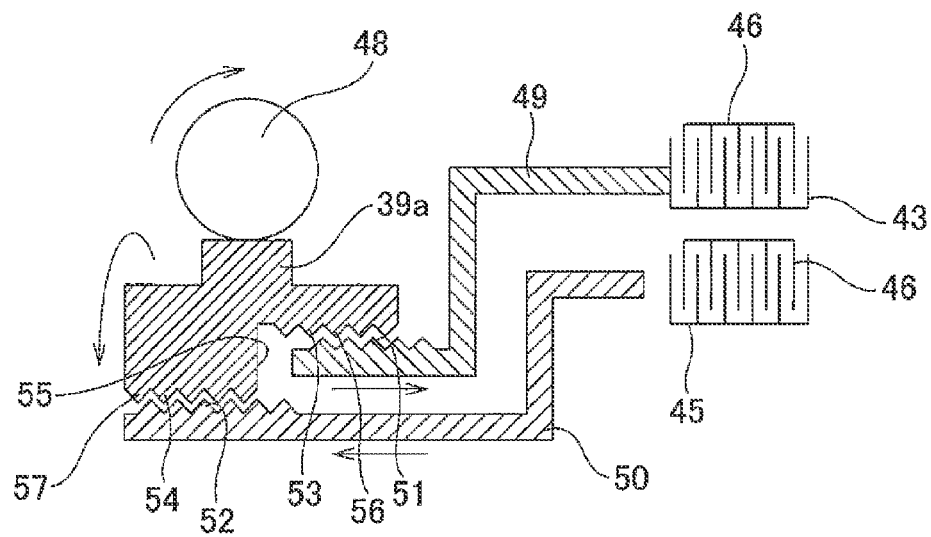
FIG. 15 is a drawing similar to FIG. 12 for the fifth example.
Figure 15:
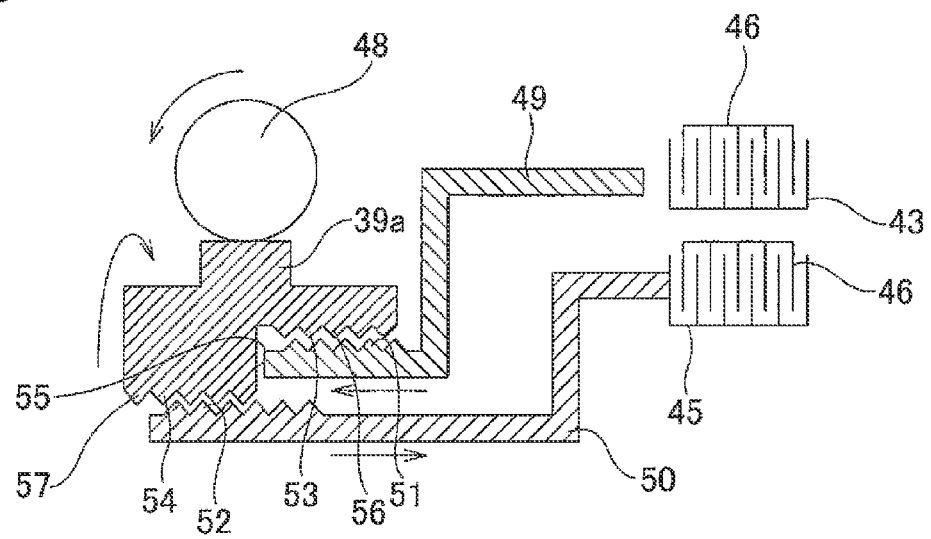

FIG. 13 to FIG. 15 illustrate a fifth example of an embodiment of the present invention. This example as well, as in the fourth example of an embodiment, is constructed such that the first braking device 14*c* and second braking device 15*c* are switched by a single actuator 37*d*. The actuator 37*d* in this example has a servo motor (not illustrated in the figure), a first piston 49, a second piston 50, and a worm wheel 39*a*. The first piston 49 and second piston 50 have a first male screw section 51 and a second male screw section 52 that are formed around the outer circumferential surface of the base end sections in the axial direction thereof (left end section in FIG. 13 to FIG. 15) such that the screw directions are in opposite directions from each other. Moreover, the worm wheel 39*a*, the inner circumferential surface thereof being a stepped cylindrical surface having a large-diameter section 53 in one half section (right half section in FIG. 13 to FIG. 15) in the axial direction and a small-diameter section 54 in the other half section (left half section in FIG. 13 to FIG. 15) in the axial direction that are continuous by way of a stepped section 55. Of the inner circumferential surface of the worm wheel 39*a*, a first female screw section 56 that engages with the first male section 51 is formed in the large-diameter section 53, and a second female screw section 57 that engages with the second male screw section 52 is formed in the small-diameter section 54.

Moreover, the first braking device 14*c* and second braking device 15*c* are placed on the same side as each other in the axial direction with respect to the actuator 37*d*, and the first friction engaging section 43 and second friction engaging section 45 of the first braking device 14*c* and second braking device 15*c* face the tip end surfaces of the first piston 49 and second piston 50, respectively. Therefore, the first piston 49 has a cylindrical shape, and with the middle section and tip end section in the axial direction of the second piston 50 inserted into the inner-diameter side thereof, the first male screw section 51 engages with and is supported by the female screw 56.

When operating in the low-speed mode state having a large reduction ratio, the drive apparatus for an electric automobile of this example, as illustrated in FIG. 15A, rotates the output shaft of the servo motor in a specified direction (clockwise direction in FIG. 15A), and rotates and drives the worm wheel 39*a*. As a result, the first piston 49 displaces in the axial direction due to engagement between the male screw section 51 and the female screw section 56, and the tip end section (right end section in FIG. 15A) of the first piston 49 presses the first friction engaging section 43 toward the fixed portion 46 (displaces toward the right in FIG. 15A). On the other hand, due to the engagement between the second male screw section 52, which is cut in the opposite direction of the first male screw section 51, and the second female screw section 57, the second piston 47 displaces in a direction (left direction in FIG. 15A) that releases the force by which the tip end section of the second piston 47 presses the second friction engaging section 45 toward the fixed portion 46. As a result, as illustrated in FIG. 14 and FIG. 15A, together with preventing rotation by way of the ring gear 22 due to the friction engagement between the first friction engaging section 43 and the fixed portion 46, rotation of the second sun gear 19 is allowed.

When operating in the high-speed mode state having a small reduction ratio, the drive apparatus for an electric automobile, as illustrated in FIG. 15B, rotates the output shaft of the servo motor in the opposite direction of the specified direction (counterclockwise direction of the FIG. 15B), and drives and rotates the worm wheel 39*a*. As a result, due to the engagement between the male screw section 51 and the female screw section 56, the first piston 49 displaces in a direction (left in FOG. 15B) that releases the force by which the tip end section of the first piston 49 presses the first friction engaging section 43 toward the fixed portion 46. On the other hand, the second piston 47 displaces in a direction (displaces toward the right in FIG. 15B) such that the tip end section of the second piston 47 presses the second friction engaging section 45 toward the fixed portion 46. As a result, as illustrated in FIG. 14 and FIG. 15B, together with preventing the rotation of the second sun gear 19 due to the friction engagement between the second friction engaging section 45 and the fixed portion 46, allows rotation of the ring gear 22.

In the case of the drive apparatus for an electric automobile of this example, as in the case of the fourth example of an embodiment, the operating state of the first braking device 14c and the second braking device 15c can be switched by a single actuator 37d, so convenience of an electric automobile is further improved. Furthermore, in this example, the first braking device 14c and the second braking device 15c are arranged in a portion adjacent in the axial direction to the first planetary-gear mechanism 12 and second planetary-gear mechanism 13 of the planetary-gear transmission 11. Moreover, the first braking device 14c and the second braking device 15c are constructed such that, by causing the first friction engaging section 43 and second friction engaging section 45, which are respectively provided on the first rotating member 42 and second rotating member 44 that rotate in synchronization with the ring gear 22 and second sun gear 19, to displace in the axial direction relative to the fixed portion 46, perform switching whether to allow or not allow rotation of the ring gear 22 and second sun gear 19. Therefore, by properly regulating the dimensions, shapes and arrangement of the members of the first braking device 14c and second braking device 15c, including the first rotating member 42 and second rotating member 44, the outer diameter of the first braking device 14c and the second braking device 15f is suppressed so as to be equal to or less than the outer diameter of the first planetary gear mechanism 12 and second planetary gear mechanism 13, and thus the drive apparatus for an electric automobile can be made even more compact. The construction and functions of the other parts of this example are the same as in the first, third and fourth example of an embodiment of the present invention.

First Reference Example

Figure 16:
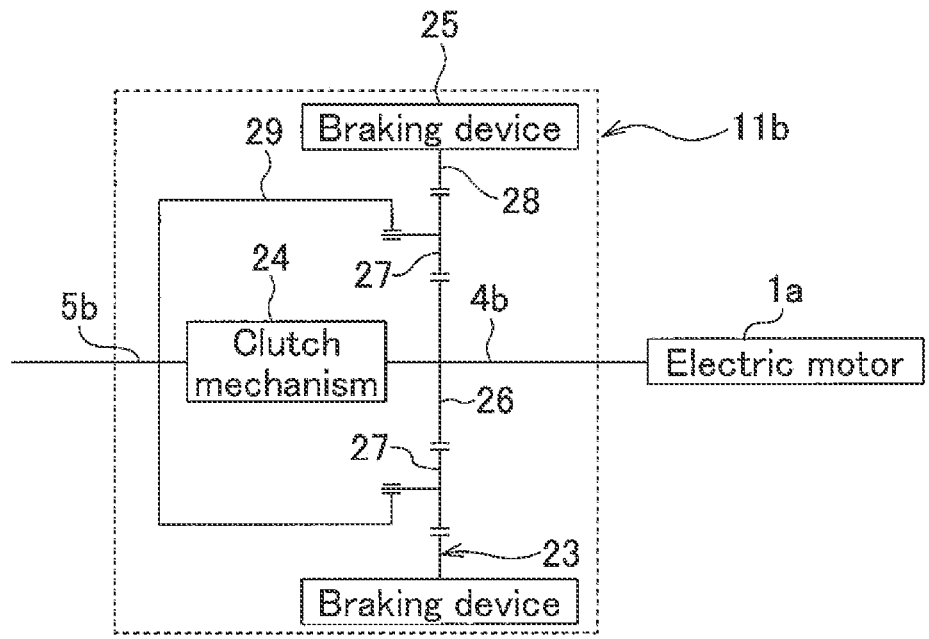
FIG. 16 is a cross-sectional drawing schematically illustrating a first example of a reference example.
Figure 20:
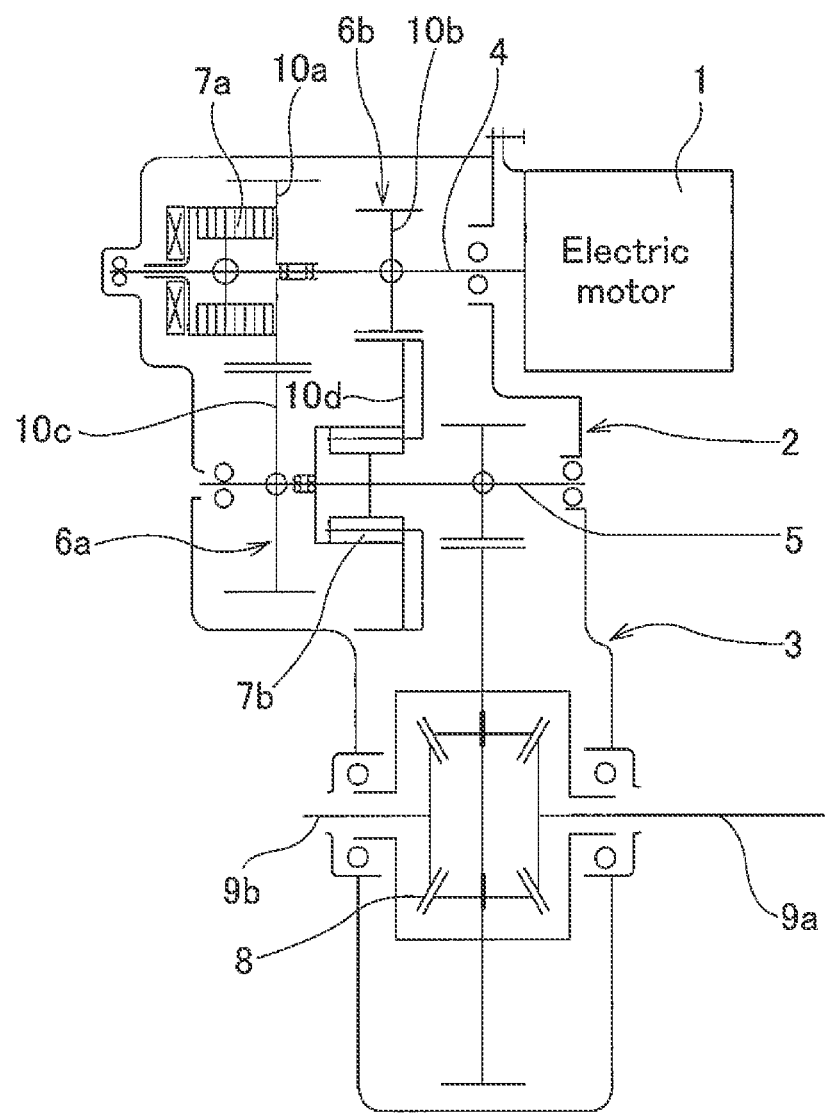
FIG. 20 is a cross-sectional drawing schematically illustrating an example of conventional construction of a drive apparatus for an electric automobile.

FIG. 16 illustrates a first reference example for a comparison with the present invention. In this reference example as well, a planetary-gear mechanism is used for the transmission that is assembled in the drive apparatus for an electric automobile. The planetary-gear transmission 11b has a drive-side rotating shaft 4b that is rotated and driven by the output shaft of the electric motor 1a, a driven-side rotating shaft 5b, a clutch mechanism 24, and a braking device 25. The driven-side rotating shaft 5b is provided so as to be concentric with the drive-side rotating shaft 4b, the rotation thereof being transmitted to the input section of a differential gear 8 by way of a rotation transmission 3 (see FIG. 20).

The planetary-gear mechanism 23 has a sun gear 26, a plurality of planet gears 27, a ring gear 28 and a carrier 29, and has single-pinion construction in which the planet gears 27, which are supported by the carrier 29 so as to be able to rotate, engage with the sun gear 26 as well as engage with the ring gear 28. The sun gear 26 is provided in the middle section in the axial direction of the drive-side rotating shaft 4b, and is rotated and driven by the drive-side rotating shaft 4b. Moreover, the carrier 29 is supported so as to transmit power to the driven-side rotating shaft 5b.

The clutch mechanism is provided between the drive-side rotating shaft 4b and the driven-side rotating shaft 5b, and makes it possible to switch between a state in which power can be transmitted, and a state in which power is not transmitted. The braking device 25 is provided between the ring gear 28 and a fixed portion such as casing, and makes it possible to switch between a state in which rotation of the ring gear 28 with respect to the fixed portion is allowed, and a state in which that rotation is not allowed.

This kind of planetary-gear transmission 11b, by switching the operating (disengaged and engaged) state of the clutch mechanism 24 and braking device mechanism 25, operates in a low-speed mode state having a large reduction ratio between the drive-side rotating shaft 4b and the driven-side rotating shaft 5b, or a high-speed mode state having a small reduction ratio. In other words, the low-speed mode is achieved by disengaging the clutch mechanism 24 so that power cannot be directly transmitted between the drive-side rotating shaft 4b and the driven-side rotating shaft 5b, and engaging the braking device 25 so that rotation of the ring gear 28 with respect to the fixed portion is prevented.

The reduction ratio $i_{L1}$ of the planetary-gear transmission 11b in the low-speed mode is expressed by Equation 4 below in which the number of teeth of the sun gear 26 is taken to be $Z_{26}$, and the number of teeth of the ring gear 28 is taken to be $Z_{28}$.

$$i_{L1} = \frac{Z_{26}}{Z_{26} + Z_{28}} \quad [\text{Equation 4}]$$

Moreover, the high-speed mode is achieved by engaging the clutch mechanism so that the power can be directly transmitted between the drive-side rotating shaft 4b and the driven-side rotating shaft 5b, and disengaging the braking device 25 so that rotation of the ring gear 28 with respect to the fixed portion is allowed. The reduction ratio $i_{H1}$ of the planetary-gear transmission 11b in the high-speed mode is 1 (there is no reduction). The step ratio $I_1$ between the low-speed mode and high-speed mode is expressed by Equation 5.

$$I_1 = \frac{Z_{26} + Z_{28}}{Z_{26}} \quad [\text{Equation 5}]$$

In order to make the step ratio 2 or near 2, it is necessary for the number of teeth of the sun gear 26 and the ring gear 28 of the planetary-gear mechanism 23 the same or nearly the same, however, in actuality, such a design is difficult. Therefore, in the drive apparatus for an electric automobile in which the planetary-gear transmission 11b is assembled, it is difficult to improve the accelerating performance and high-speed performance of a vehicle by obtaining equivalent performance as that of a gasoline engine automobile in which a typical transmission is installed. Moreover, a clutch mechanism 24 for switching between the state in which power is directly transmitted between the drive-side rotating shaft 4b and the driven-side rotating shaft 5b, and the state in which power is not transmitted, with these rotating shafts 4b, 5b in a rotating state, and there is a possibility that construction will become complex.

Second Reference Example

Figure 17:
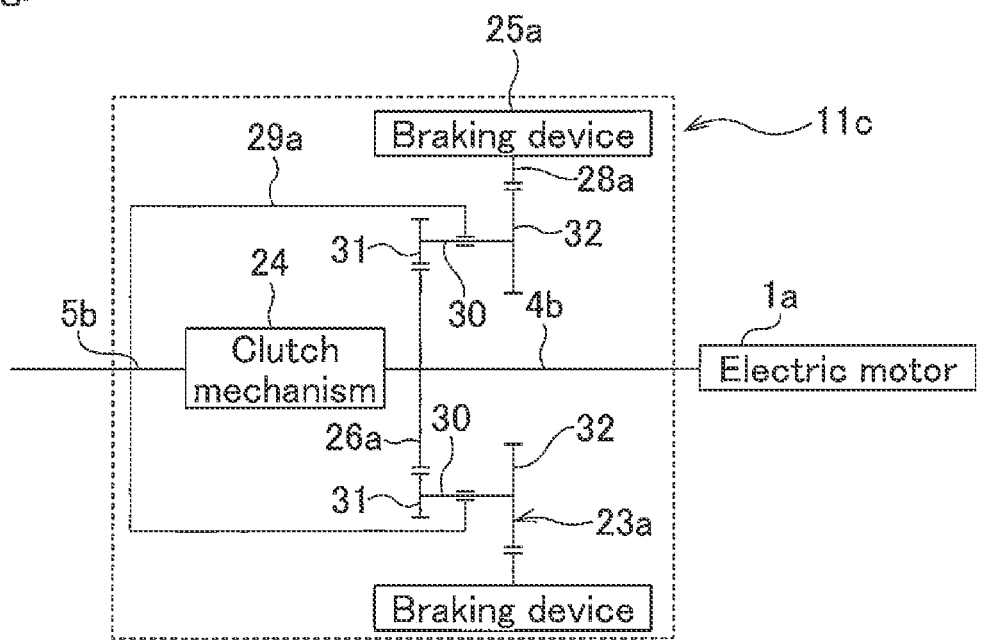
FIG. 17 is a cross-sectional drawing schematically illustrating a second example of a reference example.

FIG. 17 illustrates a second reference example for comparison with the present invention. The planetary-gear transmission 11c of this reference example has a drive-side rotating shaft 4b that is provided so as to be concentric with the electric motor 1a, a planetary-gear mechanism 23a, a driven-side rotating shaft 5b, a clutch mechanism 24 and a braking device 25a. The planetary-gear mechanism 23a is constructed such that first planet gears 31, which are supported by and fastened to one end section (left end section in FIG. 17) in the axial direction of a plurality of planet shafts 30 that are supported by a carrier 29a so as to be able to rotate, engage with the sun gear 26a, and second planet gears 32 that are supported by and fastened to the other end section (right end section in FIG. 17) in the axial direction thereof engage with the ring gear 28a.

Moreover, the braking device 25a is provided between the ring gear 28a and the fixed portion, and makes it possible to switch between a state in which rotating of the ring gear 28a with respect to the fixed portion is allowed, and a state in which rotation is prohibited.

The planetary-gear transmission of this reference example, as in the case of the first reference example, switches between a low-speed mode having a large reduction ratio and a high-speed mode having a small reduction ratio by switching the operating state of the clutch mechanism 24 and braking device 25a. The reduction ratio $i_{L2}$ of the planetary-gear transmission 11c in the low-speed mode is expressed by Equation 6 below where the number of teeth of the sun gear 26a is taken to be $Z_{26a}$, the number of teeth of the ring gear 28a is taken to be $Z_{28a}$, the number of teeth of the first planet gears 31 is taken to be $Z_{31}$, and the number of teeth of the second planet gears 32 is taken to be $Z_{32}$.

$$i_{L2} = \frac{Z_{26a}Z_{32}}{Z_{26a}Z_{32} + Z_{28a}Z_{31}} \quad [\text{Equation 6}]$$

On the other hand, the reduction ratio $i_{H2}$ in the high-speed mode is 1 (there is no reduction), so the step ratio $I_2$ between the low-speed mode and the high-speed mode is as expressed in Equation 7 below.

$$I_2 = \frac{Z_{26a}Z_{32} + Z_{28a}Z_{31}}{Z_{26a}Z_{32}} \quad [\text{Equation 7}]$$

By regulating the number of teeth $Z_{26a}$, $Z_{28a}$, $Z_{31}$ and $Z_{32}$ to proper values, the step ratio $I_2$ can be made to be 2 or close to 2, so in a drive apparatus for an electric automobile in which a planetary-gear transmission 11c is assembled, performance that is equivalent to that of a gasoline engine automobile in which a transmission is installed is obtained, and thus it is possible to improve the accelerating performance and high-speed performance of the vehicle. However, in the case of this reference example, a clutch mechanism 24 for switching between the state in which power is transmitted between the drive-side rotating shaft 4b and the driven-side rotating shaft 5b and the state in which power is not transmitted with the rotating shafts 4b, 5b rotating is necessary, so there is a possibility that construction will be complex.

Third Reference Example

Figure 18:
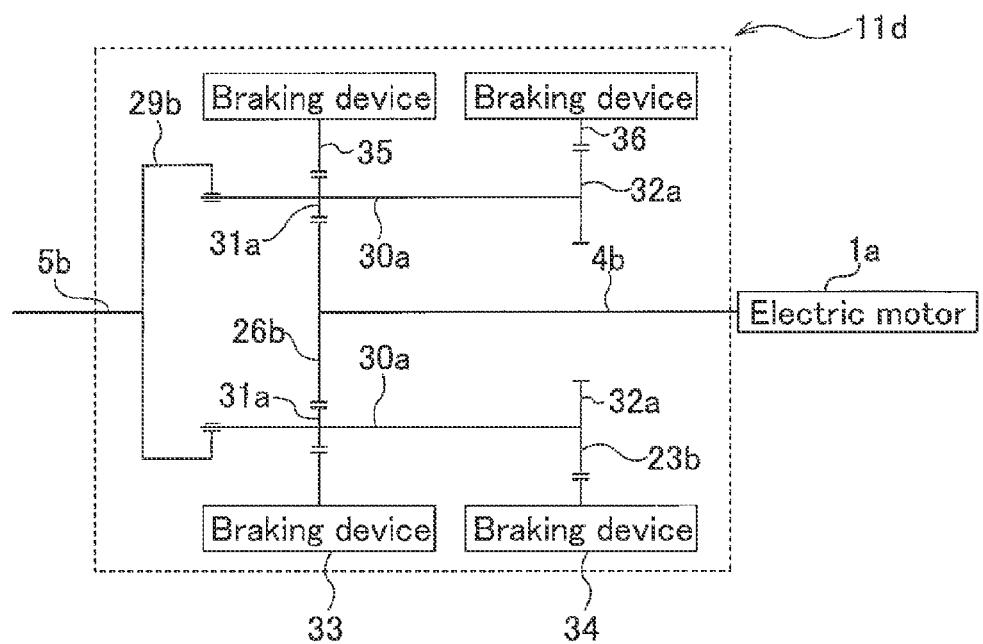
FIG. 18 is a cross-sectional drawing schematically illustrating a third example of a reference example.
Figure 19:
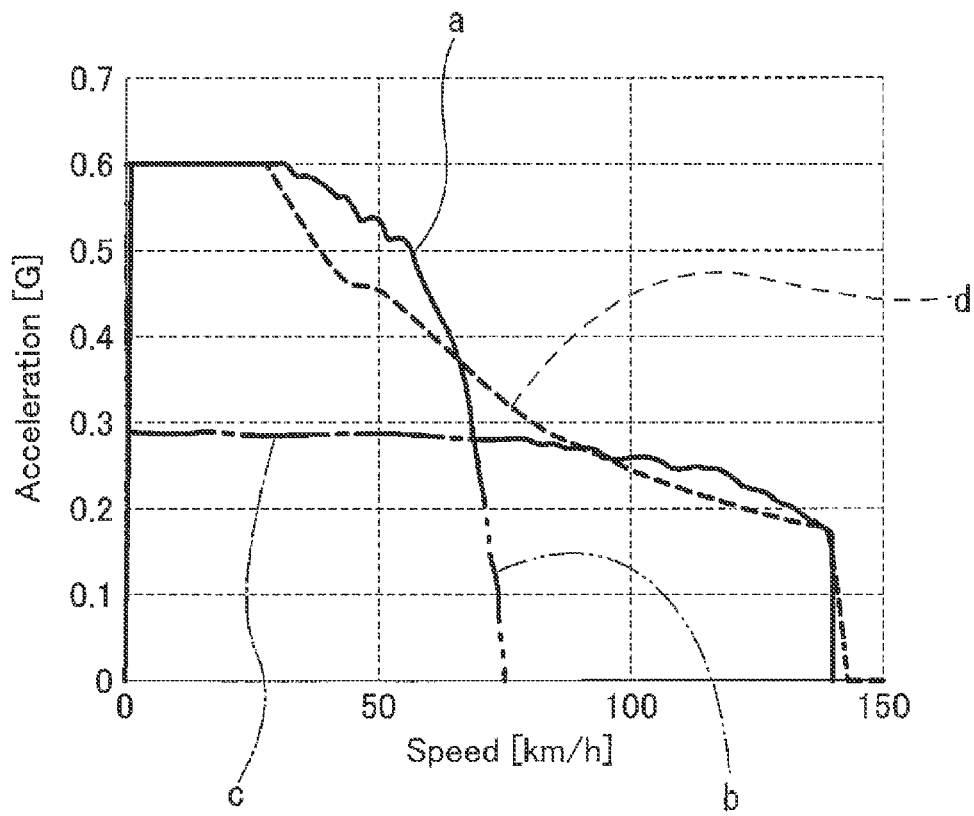
FIG. 19 is a graph for explaining the effect of including a transmission in a drive apparatus for an electric automobile.

FIG. 18 illustrates a third reference example for comparison with the present invention. The planetary-gear transmission 11d of this reference example has a drive-side rotating shaft 4b, a planetary-gear mechanism 23b, a driven-side rotating shaft 5b, a first braking device 33 and a second braking device 34. The planetary-gear mechanism 23b causes first planet gears 31a, which are supported by and fastened to the middle section in the axial direction of a plurality of planet shafts 30a that are supported by a carrier 29b so as to be able to rotate, to engage with both a sun gear 26b, and also a first ring gear 35. Moreover, the planetary-gear mechanism 23b causes second planet gears 32a that are supported by and fastened to the end sections (right end sections in FIG. 18) of the planet shafts 30 to engage with a second ring gear 36. The first braking device 33 and second braking device 34 make it possible to switch the first ring gear 35 and second ring gear 36 between a state in which rotation with respect to a fixed portion is allowed and a state in which rotation is prohibited.

In the case of the planetary-gear transmission 11d of this reference example, operation is switched between two modes having different reduction ratios by switching the operating (disengaged and engaged) state of the first braking device 33 and second braking device 34. In other words, the reduction ratio $i_a$ in the first mode, in which the first braking device 3 is engaged, preventing the rotation of the first ring gear 35, and the second braking device 34 is disengaged, allowing the rotation of the second ring gear 36, is expressed by Equation 8 below where the number of teeth of the sun gear 26b and the first ring gear 35 are taken to be $Z_{26b}$ and $Z_{35}$, respectively.

$$i_a = \frac{Z_{26b}}{Z_{26b} + Z_{35}} \quad [\text{Equation 8}]$$

Moreover, the reduction ratio $i_b$ in the second mode, in which the first braking device is disengaged, allowing the rotation of the first ring gear 35, and the second braking device 34 is engaged, preventing the rotation of the second ring gear 36, is expressed by Equation 9 below where the number of teeth of the first planet gears 31a, the second planet gears 32a and the second ring gear 36, are taken to be $Z_{31a}$, $Z_{32a}$ and $Z_{36}$, respectively.

$$i_b = \frac{Z_{26b}Z_{32a}}{Z_{31a}Z_{36} + Z_{26b}Z_{32a}} \quad [\text{Equation 9}]$$

Here, when the number of teeth $Z_{31a}$ of the first planet gears 31a is less than the number of teeth $Z_{32a}$ of the second planet gears 32a ($Z_{31a} < Z_{32a}$), the reduction ratio $i_a$ in the first mode becomes greater than the reduction ratio ib in the second mode (ia>ib). Moreover, the number of teeth Z35, Z36 of the first and second ring gears 35, 36 are expressed by Equations 10 and 11, respectively.

$$Z_{35} = Z_{26b} + 2Z_{31a} \quad [\text{Equation 10}]$$

$$Z_{36} = Z_{26b} + Z_{31a} + Z_{32a} \quad [\text{Equation 11}]$$

Therefore, the step ratio $I_{c1}$ ($=1_a/1_b$) of the planetary-gear transmission 11d is expressed by Equation 12 below.

$$I_{c1} = \frac{2 \cdot Z_{32a}}{Z_{31a} + Z_{32a}} \quad [\text{Equation 12}]$$

It is difficult to properly regulate the number of teeth $Z_{31a}$, $Z_{32a}$ of the first planet gears 31a and second planet gears 32a, and make the ratio $I_{c1}$ that is expressed in this way 2 or close to 2. In other words, according to Equation 12, in order to make the step ratio $I_{c1}$ 2 or close to 2, the number of teeth $Z_{31a}$ of the first planet gears 31a must be 0 or close to 0. In actuality, it is difficult to make the number of teeth $Z_{31a}$ 0 or close to 0, and thus it is difficult to made the step ratio $I_{c1}$ 2 or close to 2. Therefore, in the drive apparatus for an electric automobile in which the planetary-gear transmission 11d of this reference example is assembled, it is difficult to improve the accelerating performance and high-speed performance of a vehicle by obtaining performance that is equivalent to that of a gasoline engine in which a typical transmission is installed.

On the other hand, when the number of teeth $Z_{31a}$ of the first planet gears 31a is greater than the number of teeth $Z_{32a}$ of the second planet gears 32a ($Z_{31a} > Z_{32a}$), the reduction ratio $i_a$ in the first mode becomes less than the reduction ratio $i_b$ in the second mode ($i_a < i_b$). Therefore, the step ratio $L_{c2} = (i_b/i_a)$ of the planetary-gear transmission 11d is expressed by Equation 13 below.

$$I_{c2} = \frac{Z_{31a} + Z_{32a}}{2 \cdot Z_{32a}} \quad \text{[Equation 13]}$$

According to Equation 13, in order to make the step ratio $I_{c2}$ expressed in this way 2 or close to 2, the number of teeth $Z_{31a}$ of the first planet gears 31a must be about three times the number of teeth $Z_{32a}$ of the second planet gears 32a ($Z_{31a} \approx 3Z_{32a}$). When the number of teeth $Z_{31a}$ of the first planet gears 31a is about three times the number of teeth $Z_{32a}$ of the second planet gears 32a, the pitch diameter of the first planet gears 31a and the first ring gear 35 becomes large, and there is a possibility that the planetary-gear transmission 11d will become large.

From these reference examples, it can be seen that the design of a planetary-gear mechanism for obtaining performance that is equivalent to that of a gasoline engine automobile in which a typical transmission is installed is difficult by simply using a planetary-gear mechanism as the transmission, and in order to obtain the effect of the present invention, it is necessary to devise construction of the planetary-gear mechanism such as in the examples of embodiments of the present invention.

EXPLANATION OF REFERENCE NUMBERS 1, 1a Electric motor
2 Transmission
3, 3a Rotation transmission
4, 4a Drive-side rotating shaft
5, 5a Driven-side rotating shaft
6a, 6b Gear transmission mechanism
7a, 7b Clutch mechanism
8, 8a Differential gear
9a to 9d Output shaft
10a to 10d Gear
11, 11a to 11d Planetary-gear mechanism
12, 12a First planetary-gear mechanism
13 Second planetary-gear mechanism
14, 14a to 14c First braking device
15, 15a to 15c Second braking device
16 First sun gear
17 First planet gear
18 Carrier
19 Second sun gear
20 Second planet gear
21 Third planet gear
22, 22a Ring gear
23, 23a, 23b Planetary-gear mechanism
24 Clutch mechanism
25, 25a Braking device
26, 26a, 26b Sun gear
27 Planet gear
28, 28a Ring gear
29, 29a, 29b Carrier
30, 30a Planet shaft
31, 31a First planet gear
32, 32a Second planet gear
33 First braking device
34 Second braking device
35 First ring gear
36 Second ring gear
37a to 37d Actuator
38, 38a Piston
39, 39a Worm wheel
40, 40a Male screw section
41 Female screw section
42 First rotating member
43 First friction engaging section
44 Second rotating member
45 Second friction engaging member
46 Fixed portion
47 Servo motor
48 Worm gear
49 First piston
50 Second piston
51 First male screw section
52 Second male screw section
53 Large-diameter section
54 Small-diameter section
55 Stepped section
56 First female screw section
57 Second female screw section

What is claimed is:

1. A drive apparatus for an electric automobile, comprising:
an electric motor having an output shaft;
a planetary-gear transmission having a drive-side rotating shaft that is rotated and driven by the output shaft of the electric motor and a driven-side rotating shaft; and
a rotation transmission apparatus for transmitting the rotation of the driven-side rotating shaft of the planetary-gear transmission to a pair of left and right drive wheels; wherein
the planetary-gear transmission further comprises a first planetary-gear mechanism, a second planetary-gear mechanism, a ring gear, a first braking device and a second braking device;
the first planetary-gear mechanism comprises a first sun gear that is provided in a state of being rotated and driven by the drive-side rotating shaft, a plurality of first planet gears that engage with the first sun gear, and a carrier that supports the first planet gears so as to be able to rotate and rotates and drives the driven-side rotating shaft;
the second planetary-gear mechanism comprises a second sun gear, a plurality of second planet gears that are provided on the outer-diameter side and are concentric with the first planet gears, and that rotate in synchronization with the first planet gears, the same number of third planet gears as second planet gears, that are provided on the inner-diameter side and engage with the second sun gear, and a carrier that is common with that of the first planetary-gear mechanism, in which the carrier supports the second planet gears and third planet gears so as to be able to rotate freely, and in a state in which the second planet gears and third planet gears engage with each other to form a pair;
the ring gear engages with the first planet gears or the second planet gears;
the first braking device switches the ring gear and the second braking device switches the second sun gear respectively between a state in which rotation with respect to a fixed portion is prevented and a state in which rotation with respect to the fixed portion is allowed; and by switching the operating state of the first braking device and the second braking device, in a low-speed mode state having a large reduction ratio, the first braking device prevents the rotation of the ring gear with respect to the fixed portion, and the second braking device is released, allowing the second sun gear to rotate with respect to the fixed portion, and in a high-speed mode state, the first braking device is released, allowing the ring gear to rotate with respect to the fixed portion, and the second braking device prevents the second sun gear from rotating with respect to the fixed portion.

2. The drive apparatus for an electric automobile according to claim 1, further comprising an actuator for switching the operating state between the first braking device and second braking device; wherein
an electric actuator is used as this actuator and, comprises:
a piston having a male screw section around the outer circumferential surface of part in the axial direction thereof, and that is located inside a casing that houses the planetary-gear transmission so as to be able to displace in the axial direction with rotation prevented;
a servo motor having an output shaft and a worm gear that is supported by and fastened to the output shaft thereof; and
a worm wheel that is formed into a ring shape and that engages with the worm gear, and has a female screw section formed around the inner circumferential surface thereof that engages with the male screw section; and wherein
by rotating the output shaft of the servo motor and rotating and driving the worm wheel, engagement between the male screw section and the female screw section causes the piston to displace in the axial direction, and causes the fixed portion and a friction engaging section of the ring gear or second sun gear, or of portions that rotates in synchronization with the ring gear or second sun gear, to displace in a direction toward each other, which presses the friction engaging section against the fixed portion, and the friction engagement between these portions prevents rotation of the ring gear or second sun gear with respect to the fixed portion.

3. The drive apparatus for an automobile according to claim 2, wherein
a single actuator is used as the actuator, the first braking device and second braking device are located on opposite sides in the axial direction of the piston, a first friction engaging section that is formed on the ring gear or a portion that rotates in synchronization with the ring gear faces one end surface in the axial direction of the piston, and a second friction engaging section that is formed on the second sun gear or on a portion that rotates in synchronization with the second sun gear faces the other end surface in the axial direction of the piston; and when the servo motor rotates in a specified direction, the piston displaces in a direction that causes the one end section in the axial direction of the piston to press the first friction engaging section toward the fixed portion; and when the servo motor is rotated in a direction opposite the specified direction, the piston displaces in a direction that causes the other end section in the axial direction of the piston to press the second friction engaging section toward the fixed portion.

4. The drive apparatus for an electric automobile according to claim 2, wherein
a single actuator is used as the actuator, the piston comprises a first piston having a first male screw section and a second piston having a second male screw section, the first and second male screw sections respectively formed around the outer circumferential surface of the base end section in the axial direction thereof and cut in opposite directions to each other, the inner circumferential surface of the worm wheel is a stepped cylindrical surface having a large-diameter section on half in the axial direction and a small-diameter section on the other half in the axial direction that are continuous by way of a stepped section, a first female screw section that engages with the first male screw section is provided on the large-diameter section, and a second female screw section that engages with the second male screw section is provided on the small-diameter screw section, and by placing the first braking device and second braking device on the same side in the axial direction with respect to the piston, the tip end surface of the first piston faces a first friction engaging section that is formed on the ring gear or a portion that rotates in synchronization with the ring gear, the tip end surface of the second piston faces a second friction engaging section that is formed on the second sun gear or a portion that rotates in synchronization with the second sun gear; and when the servo motor is rotated in a specified direction, the first piston displaces in a direction that causes the tip end section in the axial direction of the first piston to press the first friction engaging section toward the fixed portion, and the second piston displaces in a direction that releases the force by which the tip end section of the second piston presses the second friction engaging section toward the fixed portion; and when the servo motor rotates in a direction opposite the specified direction, the first piston displaces in a direction that releases the force by which the tip end section in the axial direction of the first piston presses the first friction engaging section toward the fixed portion, and the second piston displaces in a direction that causes the tip end section of the second piston to press the second friction engaging section toward the fixed portion.

5. The drive apparatus for an electric automobile according to claim 1, wherein a step ratio, which is a value obtain by dividing the reduction ratio of the planetary-gear transmission in the low-speed mode state by the reduction ratio in the high-speed mode state is 1.8 to 2.2.

* * * * *